US009697871B2

(12) United States Patent
Hwang et al.

(10) Patent No.: US 9,697,871 B2
(45) Date of Patent: Jul. 4, 2017

(54) SYNCHRONIZING RECORDED AUDIO CONTENT AND COMPANION CONTENT

(75) Inventors: Douglas C. Hwang, New York, NY (US); Guy A. Story, Jr., New York, NY (US)

(73) Assignee: Audible, Inc., Newark, NJ (US)

( * ) Notice: Subject to any disclaimer, the term of this patent is extended or adjusted under 35 U.S.C. 154(b) by 715 days.

(21) Appl. No.: 13/570,179

(22) Filed: Aug. 8, 2012

(65) Prior Publication Data

US 2012/0324324 A1 Dec. 20, 2012

Related U.S. Application Data

(63) Continuation-in-part of application No. 13/070,313, filed on Mar. 23, 2011.

(51) Int. Cl.
| | | |
|---|---|---|
| *G11B 27/11* | (2006.01) | |
| *G09B 5/06* | (2006.01) | |
| *G06F 15/02* | (2006.01) | |
| *G11B 27/10* | (2006.01) | |
| *G10L 15/26* | (2006.01) | |

(52) U.S. Cl.
CPC .......... *G11B 27/11* (2013.01); *G06F 15/0291* (2013.01); *G09B 5/06* (2013.01); *G11B 27/10* (2013.01); *G10L 15/26* (2013.01)

(58) Field of Classification Search
CPC ................................................. G06F 15/0291
See application file for complete search history.

(56) References Cited

U.S. PATENT DOCUMENTS

| | | |
|---|---|---|
| 5,657,426 A | 8/1997 | Waters et al. |
| 6,356,922 B1 * | 3/2002 | Schilit et al. ................ 715/236 |
| 6,766,294 B2 | 7/2004 | MacGinite |

(Continued)

FOREIGN PATENT DOCUMENTS

| | | |
|---|---|---|
| NZ | 532174 | 1/2007 |
| WO | WO 2011/144617 | 11/2011 |

OTHER PUBLICATIONS

Fabio Vignoli, Carlo Braccini, Aug. 7-10, 2009, A Text-Speech Synchronization Technique With Application to Talking Heads, Auitory-Visual Speech Processing, ISCA Archive.*

(Continued)

*Primary Examiner* — Hassan Phillips
*Assistant Examiner* — Omeed D Rahgozar
(74) *Attorney, Agent, or Firm* — Knobbe, Martens, Olson & Bear, LLP

(57) ABSTRACT

Aspects of the present disclosure relate to synchronously presenting companion content, such as text content of an electronic book, while recording or presenting narration audio content spoken by a narrator. For example, recorded audio content may be received that corresponds to words of the companion content as spoken by a narrator. The recorded audio content may be received at least substantially in real time as the words are spoken. Content synchronization information for the recorded audio content and the text content may be generated, where the content synchronization information maps portions of the recorded audio content to corresponding portions of the text content. The audio content and the text content may be synchronously presented to a user based at least in part on the content synchronization information.

13 Claims, 15 Drawing Sheets

(56) References Cited

U.S. PATENT DOCUMENTS

| | | |
|---|---|---|
| 7,107,533 B2 | 9/2006 | Duncan et al. |
| 7,231,351 B1* | 6/2007 | Griggs ........................ 704/251 |
| 8,109,765 B2 | 2/2012 | Beattie et al. |
| 8,131,545 B1* | 3/2012 | Moreno et al. ............... 704/235 |
| 8,131,865 B2* | 3/2012 | Rebaud et al. ............... 709/229 |
| 8,548,618 B1 | 10/2013 | Story, Jr. et al. |
| 2002/0002459 A1 | 1/2002 | Lewis et al. |
| 2002/0007349 A1* | 1/2002 | Yuen ............................. 705/52 |
| 2002/0041692 A1 | 4/2002 | Seto et al. |
| 2002/0116188 A1 | 8/2002 | Amir et al. |
| 2003/0061028 A1* | 3/2003 | Dey et al. ........................ 704/9 |
| 2003/0083885 A1 | 5/2003 | Frimpong-Ansah |
| 2003/0115289 A1 | 6/2003 | Chinn et al. |
| 2004/0261093 A1 | 12/2004 | Rebaud et al. |
| 2006/0148569 A1 | 7/2006 | Beck |
| 2007/0016314 A1 | 1/2007 | Chan et al. |
| 2007/0047003 A1 | 3/2007 | Suwabe et al. |
| 2007/0061487 A1 | 3/2007 | Moore et al. |
| 2007/0136459 A1 | 6/2007 | Roche et al. |
| 2008/0177822 A1 | 7/2008 | Yoneda |
| 2008/0294453 A1 | 11/2008 | Baird-Smith et al. |
| 2009/0136213 A1 | 5/2009 | Calisa et al. |
| 2009/0222520 A1 | 9/2009 | Sloo et al. |
| 2009/0228570 A1 | 9/2009 | Janik et al. |
| 2009/0233705 A1 | 9/2009 | Lemay et al. |
| 2009/0319273 A1 | 12/2009 | Mitsui et al. |
| 2010/0042682 A1 | 2/2010 | Kaye |
| 2010/0064218 A1 | 3/2010 | Bull et al. |
| 2010/0070575 A1 | 3/2010 | Bergquist et al. |
| 2010/0286979 A1* | 11/2010 | Zangvil et al. ................... 704/9 |
| 2010/0287256 A1 | 11/2010 | Neilio |
| 2011/0067082 A1 | 3/2011 | Walker |
| 2011/0087802 A1 | 4/2011 | Witriol et al. |
| 2011/0119572 A1 | 5/2011 | Jang et al. |
| 2011/0231474 A1* | 9/2011 | Locker et al. ................. 709/203 |
| 2011/0296287 A1 | 12/2011 | Shahraray et al. |
| 2012/0030288 A1 | 2/2012 | Burckart et al. |
| 2012/0150935 A1 | 6/2012 | Frick et al. |
| 2012/0166180 A1* | 6/2012 | Au .................................... 704/9 |
| 2012/0197998 A1 | 8/2012 | Kessel et al. |
| 2012/0245720 A1 | 9/2012 | Story, Jr. et al. |
| 2012/0246343 A1 | 9/2012 | Story, Jr. et al. |
| 2012/0315009 A1 | 12/2012 | Evans et al. |

OTHER PUBLICATIONS

Yardena Arar, Jan. 7, 2010, Blio E-Book Platform: No Reader (Yet), But Great Graphics.*

Beattie, Valerie et al., "Reading Assistant: Technology for Guided Oral Reading", Scientific Learning, Apr. 10, 2012, 5 pages.

Dzik, et al., U.S. Appl. No. 13/604,482, filed Sep. 5, 2012, entitled "Identifying Corresponding Regions of Content."

Dzik, et al., U.S. Appl. No. 13/604,486, filed Sep. 5, 2012, entitled "Selecting Content Portions for Alignment."

Dzik, Steven Charles, U.S. Appl. No. 13/662,306, filed Oct. 26, 2012, entitled "Content Presentation Analysis."

Enhanced Editions, "Feature: Synched Audio and Text" Aug. 31, 2009, last accessed Nov. 15, 2012, available at http://www.enhanced-editions.com/blog/2009/08/enhanced-editions-features-exclusive-soundtracks-and-extracts/.

Hwang et al., U.S. Appl. No. 13/536,711, filed Jun. 28, 2012, entitled "Pacing Content."

International Search Report issued for PCT/US12/30198 mailed on Jun. 20, 2012, 16 pages.

Levinson, S.E. et al., "Continuous Speech Recognition from a Phonetic Transcription", Acoustics, Speech, and Signal Processing, Apr. 1990, pp. 190-199.

Roub, Paul, "I'll Buy an E-book Reader When . . . ", Nov. 16, 2007, available at: http://roub.net/blahg/2007/11/16/ill-buy-an-eboo/ (accessed: Sep. 6, 2012), 2 pages.

Weber, Frederick V., U.S. Appl. No. 13/531,376, filed Jun. 22, 2012, entitled "Modelling Expected Errors for Discriminative Training."

* cited by examiner

*Fig. 9*

*The Adventures of Tom Sawyer*

Show and Sort

*900*

"*TOM!*"

No answer.

"*TOM!*"

No answer.

"What's gone with that boy, I wonder? You TOM!"

No answer.

The old lady pulled her spectacles down and looked over them about the room; then she put them up and looked out under them. She seldom or never looked *through* them for so small a thing as a boy; they were her state pair, the pride of her heart, and were built for "style," not service -- she could have seen through a pair of stove-lids just as well. She looked perplexed for a moment, and then said, not fiercely, but still loud enough for the furniture to hear:

"Well, I lay if I get hold of you I'll --"

Menu

*Fig. 13*

Alice's Adventures in Wonderland

* CURRENTLY RECORDING AUDIO *
Audio is being streamed to Bobby with synchronization information — 1310

1300

The rabbit-ho... some way,
and then dipt... at Alice had
not a momen... before she
found herself

1320

You seem to be having trouble
with a word:

"MARMALADE"
[mahr-muh-leyd] – Listen

Definition: a jellylike preserve in which
small pieces of fruit are suspended

[ Continue ]  [ Turn off help ]
  1322              1324

Either the we... wly, for she
had plenty of... her and to
wonder what... she tried to
look down an... , but it was
too dark to se... sides of the
well, and no... boards and
book-shelves; here and there she saw maps and pictures
hung upon pegs. She took down a jar from one of the shelves
as she passed; it was labelled 'ORANGE MARMALADE' but —1312
to her great disappointment it was empty: she did not like to
drop the jar for fear of killing somebody, so managed to put
it into one of the cupboards as she fell past it.

[ Menu ]

SYNCHRONIZING RECORDED AUDIO CONTENT AND COMPANION CONTENT

RELATED APPLICATIONS

This application is a continuation-in-part of U.S. patent application Ser. No. 13/070,313, filed Mar. 23, 2011, the entirety of which is hereby incorporated by reference herein.

BACKGROUND

Generally described, computing devices and communication networks facilitate the collection and exchange of information. In a common application, computing devices, such as personal computing devices, can utilize a wide area communication network, generally referred to as the Internet, to access content, or other data, from other computing devices associated with content providing entities. The specific design/function of each computing device can vary the type of content exchanged between the computing devices.

Users can request data from a content providing entity so that the content is delivered to one or more computing devices in a relatively "real time" basis. For example, users can request content from a network resource (e.g., a Web site, Web service, or cloud node) for immediate presentation on a computing device display screen or they can request the immediate transfer of content, such as a document or data file, from a network resource or Web service for storage on the computing device. In another example, users can transmit a request, or initiate a transaction, that results in the downloading or streaming of content to a computing device. Typically, the content providing entity would initiate the transfer upon receipt of the request from the computing device.

In one application, various computing devices associated with a user or a user account have access to different representations of companion content. For example, a user may utilize a computing device such as an electronic book reader ("e-book reader") that has obtained a digital representation of content (e.g., an electronic book ("e-book") or other digital publication that can be presented on an e-book reader) via a communication network (e.g., a wireless communication network). This content may be referred to as a "first" content. The same user may also utilize a computing device such as a laptop that has obtained a separate companion representation of the same or similar content (e.g., an audio book that can be audibly presented via headphones/speakers and that corresponds to the e-book obtained by the user's e-book reader). This content may be referred to as a "second" content. The second content may be obtained at a different time and/or from a different source than the first content. As a result, the first content and the second content can be decoupled from one another, and additional features related to the synergy of the first content and the second content (collectively, the "companion content") are not readily available to computing devices utilized by the user or associated with the user's account maintained by a content provider.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIG. 9 depicts an illustrative computing device synchronously presenting companion content.

FIG. 13 is an illustrative interface generated for display by a computing device during recording of narration audio content.

DETAILED DESCRIPTION

Figure 1:
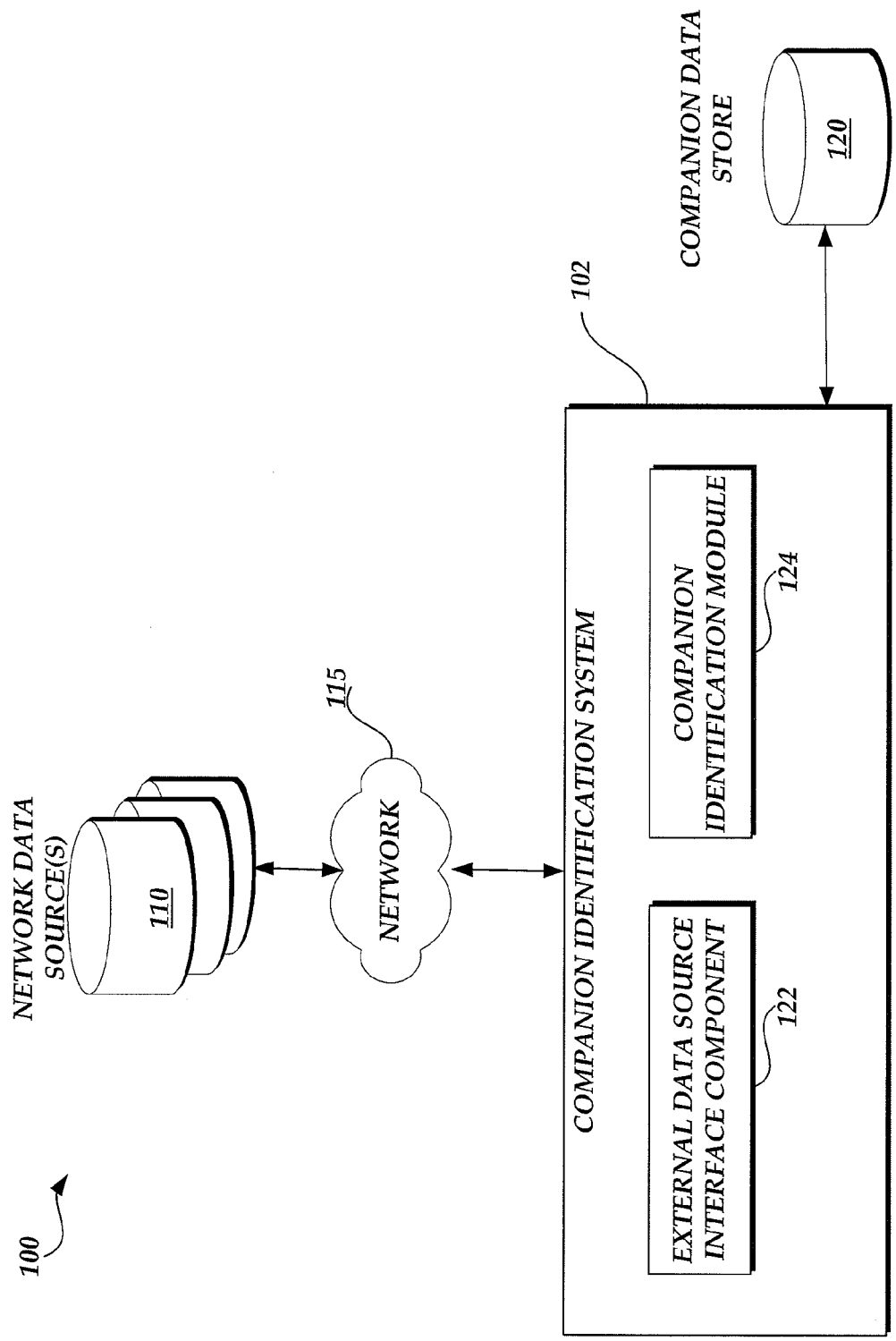
FIG. 1 is a block diagram depicting an illustrative companion identification environment for use in identifying companion content that can be synchronously presented.

Generally described, aspects of the present disclosure relate to the management of content and/or information related to the content. Specifically, aspects of the present disclosure relate to managing decoupled companion content so that it can be synchronized. While the disclosure may focus on examples of synchronously presenting content for illustrative purposes, the principles and advantages described herein may be applied to other ways of synchronizing content. Content can refer to any data that can be directly or indirectly accessed by a user, including, but not limited to, multi-media data, digital images, digital video, displayable text, audio data, electronic documents, electronic publications/books, computer-executable code, portions of the above, and the like.

A first content and a second content that can be synchronized may be referred to as companion content or a companion content pair. For each pair of companion content, content synchronization information associated with the companion content can be generated, transmitted, and/or obtained via computing devices in a communication network. The content synchronization information can include any data related to the synchronous presentation of the first content and the second content, so as to enable one or more computing devices to synchronously present the companion content. Content synchronization information can include reference points mapping portions of the first content to corresponding portions of the second content. In a specific example, content synchronization information can include data that can be used to map a segment of text (e.g., a word, line, sentence, etc.) to a timestamp of a corresponding audio recording. The content synchronization information can also include information related to the relative progress of the presentation, or a state of presentation of the digital representation of the content. The synchronous presentation of the companion content can vary as a function of the capabilities and/or configuration of the device (e.g., a portable e-book reader vs. a mobile phone) and/or the formats of the content in a companion content pair (e.g., a digital publication and an audio recording vs. a video and an audio recoding). Accordingly, the content synchronization information can be generated in a variety of formats, versions, etc. Moreover, the content synchronization information can include a match score and/or a passage mismatch score, as will be described in more detail below, which can be used for synchronously presenting content. In addition, the content synchronization information can include any combination of features or data used to synchronize content in U.S. patent application Ser. No. 12/273,473 ("the '473 Application"), filed Nov. 18, 2008, entitled "SYNCHRONIZATION OF DIGITAL CONTENT," which is hereby incorporated by reference in its entirety.

However, the first and second content in a companion content pair may be decoupled from each other. Companion content may be decoupled from each other, for example, by being stored on separate computing devices, by being stored in separate data stores that are not part of the same logical memory, by being obtained via different transactions, by being obtained at different times, by being obtained from different sources, or any combination thereof. For instance, a user can buy an e-book and then at a later point in time purchase an audio book version of the e-book from a different vendor. In such cases, the user may wish to listen to the audio book while simultaneously reading the e-book. However, when such companion content is decoupled, it can be difficult to provide the user with a synchronous presentation experience, such as presenting portions of the audio book corresponding to text of the e-book presented on a display.

The decoupled nature of companion content can result in a number of difficulties for providing a user with a synchronous presentation experience. Such difficulties may include, for example, determining sources from which to obtain content information identifying the content, identifying that a second content matches or is a companion to a first content, generating content synchronization information needed to synchronize presentation of the first and second content, providing content synchronization information to a computing device with access to the first and/or second content, managing the storage of information related to the first and/or second content, or any combination thereof.

Since the first content and the second content of a companion content pair may be decoupled from each other, one or more computing devices may identify a content match, which indicates that the second content may be a companion of the first content. Further, the one or more computing devices can also identify that a user is associated with and/or has access to the first content and the second content. Based on determining the content match, the one or more computing devices can identify a receiving computing device associated with the user, and cause transmission of content synchronization information related to the companion content to the receiving computing device. Thereafter, the receiving computing device can utilize the content synchronization information to synchronously or simultaneously present the companion content to the user. Those skilled in the art will appreciate that more than one individual content may match or be a companion to another content. Accordingly, more than two individual contents may be synchronously presented without departing from the scope of the present disclosure. In addition, in some embodiments, one or more receiving computing devices associated with one or more users may receive the content synchronization information and utilize the content synchronization information to synchronously present the companion content.

As an illustrative, non-limiting example, a user may obtain access to companion content (e.g., an e-book formatted for an e-book reader, an audio book, and an e-book formatted for a mobile phone) that can be synchronously presented. More specifically, the user may initially obtain a first content, such as an e-book of *The Adventures of Tom Sawyer*, and store the e-book on the user's e-book reader. In some instances, the audio book of *The Adventures of Tom Sawyer* may become available after the user obtains the first content. Yet, in other instances, the audio book of *The Adventures of Tom Sawyer* may already be available when the user obtains the first content. The user may then obtain this second content, i.e., the audio book of *The Adventures of Tom Sawyer*, via a separate transaction, which can include purchasing, lending, sharing, transferring, or any combination thereof. The separate transaction may be a purchase transaction resulting from a message that the audio book has become available or from browsing a catalog of available audio books. After the audio book and the e-book are obtained, the user may desire to synchronously listen to the audio book while viewing the e-book.

In this regard, a content management system can identify that the first content and the second content are a content match, based on determining that the first and second content are companion content. The content management system may be implemented by one or more computing devices, which may, in some instances, include any computing device(s) associated with the user. The content information may be obtained, for example, from network resources, such as an external data source that includes purchase information associated with a user or user account, and/or from information the user shares from a computing device, such a list of content available to the computing device.

In addition to identifying a content match, the content management system can also identify a computing device associated with the user that can synchronously present the first and second content, such as the e-book reader or another computing device. A particular version of the content synchronization information may be transmitted to the identified device in order to be compatible with the companion content that is presented using the identified computing device and/or be compatible with identified computing device itself. For example, a different version of content synchronization information may be provided to an e-book reader versus a mobile phone, based on different formats used to visually present the text of an e-book. The identified computing device may already store the companion content or the content management system may cause at least a portion of the companion content to be transmitted to the identified computing device. The content management system can also cause content synchronization information to be transmitted to the identified device.

With the companion content and the content synchronization information available to the same computing device, the computing device can synchronously present the companion content to provide the user with an enhanced content consumption experience. For instance, the user may listen to the audio book of *The Adventures of Tom Sawyer* while viewing the corresponding text of the e-book, which text can be highlighted, underlined, or otherwise enhanced to correspond to the playback of the audio book. The synchronous presentation experience may also include, for example, automatic page turning synchronized with audio playback and/or aligning search results in one format with a presentation position of the other format, with subsequent synchronous presentation starting at the search result position.

With reference now to FIG. 1, a block diagram depicting an illustrative companion identification environment 100 for use in identifying content that can be synchronized will be described. As illustrated in FIG. 1, the companion identification environment 100 includes a companion identification system 102 for obtaining content information and/or content synchronization information transmitted from one or more network data sources 110 via a network 115, such as the Internet or other communications link. Any of the networks described herein may be any wired network, wireless network or combination thereof. In addition, any of the networks described herein may be a personal area network, local area network, wide area network, cable network, satellite network, cellular telephone network, etc., or any combination thereof. Additionally, the companion identification system 102 can store content information and/or companion content information in an electronic companion data store 120.

As illustrated in FIG. 1, the content identification system 102 can include an external data source interface component 122 for obtaining content information from network-based resources. The content information can be any information from which content can be identified, such as information corresponding to an identifier, title, format, version, content data itself, and/or other information associated with content. The external data source interface component 122 may also be utilized to cause the transmission of information to the one or more network data sources 110 and/or to a content management system, for example, as described in reference to FIG. 2.

The content identification system 102 can also include a companion identification module 124 for processing the content information from the network data sources 110 and determining which contents are companion content that can be synchronized. The companion identification module 124 may use a product identifier and/or metadata (e.g., title, author, edition, etc.) related to the content can be used to identify companion content. For instance, such information can be used to determine that different formats/versions of the same or similar content, such as *The Adventures of Tom Sawyer* e-book and *The Adventures of Tom Sawyer* audio book, are companion content. In some implementations, the companion identification module 124 may further process the content information to identify companion content by applying filtering, spell/grammar check, and any other suitable automated algorithms. In addition, the companion identification module 124 can incorporate additional reference materials to identify a content match, for instance, by accessing a uniform resource identifier. Further, the content identification module 124 may compare pairs or other combinations of content to determine whether each pair/combination is companion content, for example, by correlating each pair/combination of content in a common format. More specifically, if the content information corresponds to information related to the presentation of a specific representation of content (e.g., an audio book), the companion identification module 124 may translate at least a portion of the content into a format corresponding a different version of the content (e.g., translating audio into a specific e-book format) and/or into a generic format (e.g., text). The translated content information can be correlated with other content information to determine whether each pair of content is companion content that can be synchronized. In other implementations, the companion identification module 102 may prompt a user to enter data (e.g., title, author, edition, etc.) for one or more contents. The companion identification module 124 may compare the data in order to identify companion content. In yet other implementations, the companion identification module 124 may prompt a user to confirm that the first and second content are companion content.

Those skilled in the art will appreciate that even though a first content and a second content may be companion content, the first content may not correlate exactly to the second content. For example, the audio book of *The Adventures of Tom Sawyer* may not exhibit a one-to-one correspondence to the e-book of *The Adventures of Tom Sawyer* due to differences between the narration script of the audio book and the text of the e-book, differences between editions, differences in "front matter" (e.g., introduction to the audio production, table of contents, index, etc.) and/or "back matter," differences between unabridged and abridged versions, differences in format of content, differences in device capabilities, etc. Due to the existence of such uncorrelated portions of potential companion content, the companion identification module 124 can be configured to identify companion content amongst pairs/combination of content that include mismatching portions. Although more detail will be provided below with reference to correlating portions of an unabridged version of an e-book with an abridged version of the corresponding audio book, the concepts described may be applied to any application in which a first and second content include mismatching portions.

As noted above, when correlating an unabridged version of an e-book with an abridged version of the corresponding audio book, mismatches can result from a number of sources, such as deletions, modifications, insertion of new material, or any combination thereof. Yet the abridged version of the e-book may include large portions of unmodified material, which may strongly correlate with the abridged version of the audio book. Accordingly, in some embodiments, the companion identification module 124 may detect mismatches between an abridged version and an unabridged version of content using algorithms that solve "longest common sequence" problems, an implementation of which can be found, for example, in the UNIX "diff" operation. The companion identification module 124 can then generate content synchronization information for the correlated portions of the different versions and provide the content synchronization information to the user's computing device for use when synchronizing presentation of the abridged audio book with the unabridged e-book. More specifically, the companion identification module 124 can correlate unmodified material similarly to how a full book and a full audio book are correlated. However, for passages of an abridged version with small-scale modifications, the companion identification module 124 may correlate the modified material and generate an indicator that these portions include some mismatches. Although new and deleted material in the abridged version may not correlate with the full version, these uncorrelated passages and modified material can be handled so as to provide the most useful and natural user experience. This may include disabling a subset of synchronous presentation features and/or providing an indication of small scale mismatches. As a non-limiting example, when a user listens to the abridged audio book while viewing the unabridged e-book with synchronized highlighting of text, small scale modifications may be highlighted differently to indicate that audio playback does not completely match the written text. Similar techniques can be applied when correlating an unabridged audio book with a companion unabridged e-book, as some material may not match between these versions.

An illustrative method that can be implemented by the companion identification module 124 for processing mismatches will now be described in general terms. First, potential companion content can be converted into a common format, such as text and/or phoneme. Then an attempt is made to match content at a small scale (e.g., at a word level) can be performed. Since missing or added passages can include larger portions (e.g., whole sentences or paragraphs) that do not match, a passage mismatch score indicating the frequency of mismatches can be computed for sentences, paragraphs, and/or other units of text. For example, the passage mismatch score may represent a number and/or percentage of word mismatches for a larger portion of text (e.g., a sentence, paragraph, or page). Sequences of larger portions with similarly high mismatch frequencies compared with adjoining sequences (where "high" can be set empirically from analyzing correlation of known companion content) can be identified. These sequences may represent content that should not be synchronized with other content in a companion content pair. The high mismatch passages can be removed in either or both contents, and matching can be reattempted at a smaller scale (e.g., at the word level). Metadata can be generated based on the correlation(s) to determine alignment points for the content synchronization information. The metadata may also include information identifying reference points in at least one of the companion content at which a matching portion begins/ends.

The content identification module 124 can also cause a notification to be sent in response to identifying companion content. For example, when new companion content becomes available (e.g., *The Adventures of Tom Sawyer* audio book), a notification that companion content is available can be sent to users who already own corresponding content (e.g., *The Adventures of Tom Sawyer* e-book). Such a notification can be sent, for example, via electronic mail, push notification, telephony message, automatic download request or any network messaging or communication protocol available between a computing device and the content identification module 124. The notification can be sent to a computing device that is configured to present content and/or that stores the corresponding content. This notification may be used by the computing device to inform and/or assist a user in obtaining the second content via purchase (e.g., via a browser used to navigate an electronic shopping service that offers the second content for sale), lending, sharing, and/or transfer of ownership services. Further, notifications, messages, and/or other communications regarding companion content can be sent in a variety of other contexts. Some example contexts can include a user browsing available content before the user has access to any of the companion content, and sending a user a promotional offer to sample companion content (e.g., a chapter of an audio book and a chapter of an e-book) to try a synchronous presentation experience.

Returning to FIG. 1, the companion identification module 124 may also determine a match score indicative of how well a first content correlates with a second content. The match score may apply to the entire first content and second content or to a subset thereof (e.g., a chapter, act, or part). The match score may be indicative of the overall quality of synchronously presenting the companion content, while the passage mismatch score described above may be useful in synchronously presenting the companion content, for example, as will be described below with reference to FIGS. 7 and 8. The match score may be calculated like the passage mismatch score described above. In some instances, the match score can correspond to a percentage or ratio of any unit of the first content correlating to a corresponding unit of the second content. In a specific example, the match score can be the percentage of words in an e-book that correlate to corresponding words in an audio book. The match score may be used to determine whether pairs of content are companion content. For example, a minimum match score can be used as a threshold value for determining that a content pair is companion content for which content synchronization information will be generated.

Since portions of companion content may not correlate with each other, the match score can be used to process companion content with varying ranges of correlations into any number of groups that can be processed differently. For example, using the match score, the companion identification module 124 may synchronize an unabridged e-book with a corresponding unabridged audio book or synchronize the unabridged e-book with a corresponding abridged audio book. Accordingly, the user's computing device can automatically present companion content synchronously when the match score satisfies a threshold and/or provide a subset of features related to synchronizing the companion content when the companion content has a match score below a predetermined threshold.

The content identification system 102 can further be associated with the companion data store 120 for storing content information obtained by the external data source interface component 122, utilized by the companion identification module 124, and/or generated by the companion identification module 124. The companion data store 120 can also store content synchronization information obtained and/or generated by the content management system 202. The companion data store 120 may store content information used to determine whether content pairs are companion content, data indentifying companion content, and/or match scores. For instance, the companion data store may store a list, database, or other suitable data structure that identifies companion content as determined by the content identification system 102.

The content identification system 102 may be operable on one or more computing devices, such as server computing devices, cloud nodes, client computing devices, and/or mobile computing devices. Additionally, the external data source interface component 122 and/or the companion identification module 124 may be implemented in a single computing device or across multiple computing devices. Likewise, although the companion data store 120 is illustrated as local to the content management system 102, the data store 120 can correspond to a distributed data store and/or a network based data store. The content identification system 102 may include any one of a number of additional hardware and/or software components that would be utilized in the illustrative computerized network environment to carry out the illustrative functions of the content identification system 102 and/or any of the individually identified components.

Figure 2:
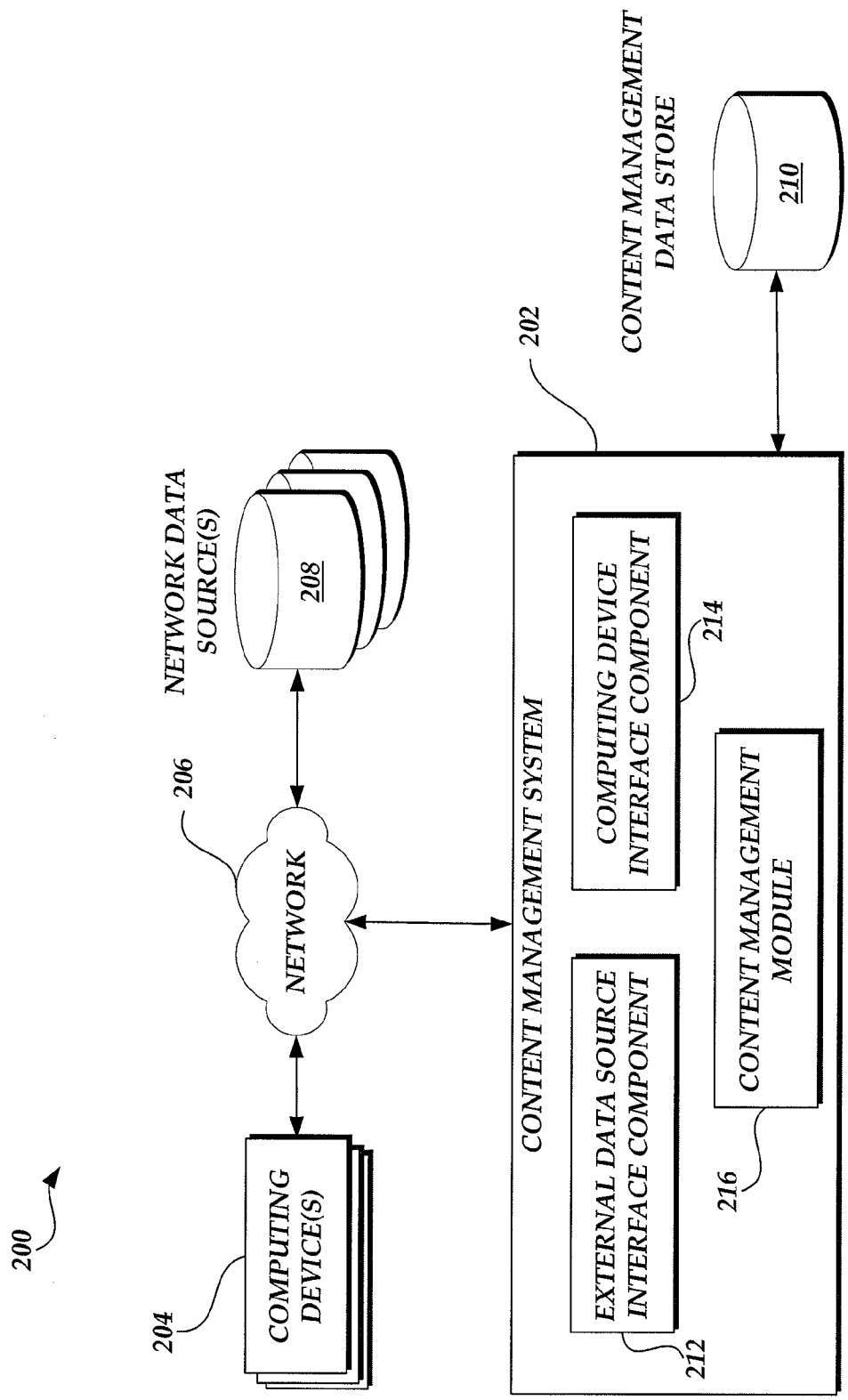
FIG. 2 is a block diagram depicting an illustrative content management environment for use in providing synchronization information to one or more computing devices.

Referring to FIG. 2, a block diagram depicting an illustrative content management environment 200 for use in managing content synchronization information will be described. As illustrated in FIG. 2, the content management environment 200 includes a content management system 202 for managing content synchronization information. The content match may be determined from content information obtained from one or more computing devices 204 and/or one or more network data sources 208 via the network 206. Additionally, the content management system 202 can store content information, content synchronization information, and/or other information related to content management in an electronic content management data store 210.

The content management environment 200 can include one or more computing devices 204 for presenting content to a user. In an illustrative embodiment, the computing devices 204 can include various hardware and/or software components for obtaining and presenting digital content to a user, including, but not limited to, browser software applications, image viewing software applications, electronic publication viewing software applications, media playing software applications, and the like. The computing devices 204 can correspond to a wide variety of devices or components that are capable of initiating, receiving or facilitating communications over a communication network and/or presenting content. The computing devices 204 can include, but are not limited to, a laptop, personal computer, a tablet computer, personal digital assistant (PDA), hybrid PDA/mobile phone, mobile phone, electronic book reader, digital media player, television, integrated components for inclusion in computing devices, appliances, electronic devices for inclusion in vehicles or machinery, gaming devices, and the like.

The content management system 202 can include an external data source interface component 212 for obtaining content information from network-based resources, such as the network data sources 208 and/or the companion identification system 102. The content management system 202 can also include a computing device interface component 214 for obtaining content information from computing devices 204. The content information obtained from the network data sources 208 and/or the computing devices 204 may include any information that can be used to identify a content match and/or a device to send content synchronization information. For instance, the content information may include information that identifies content, information associating content with a user or group of users, and/or information related to the content itself. By obtaining content information from different sources and/or at different points in time, the content management system 202 can be used to gather data related to decoupled content. In this way, the content management system 202 can identify relationships between decoupled content that may otherwise be unknown due to the decoupled nature of the content.

The content management system 202 can also include a content management module 216 for identifying a content match, identifying a computing device 204 to transmit content synchronization information to, causing transmission of content synchronization information to one or more computing devices 204 via a network 206, or any combination thereof. The external data source interface component 212 and the computing device interface component 214 may be utilized to cause the transmission of information to the one or more network data sources 208 and/or one or more computing devices 204, respectively.

The content management system 202 can further be associated with the content management data store 220 for storing content information, companion content information, device identification information, content synchronization information, other information related to content management, or any combination thereof. Such information may be obtained by the content management system from the computing devices 204 and/or the network data sources 208 via the network 206. In addition, the information stored in the content management data store 210 can be generated by the content management system 202, for example, by the content management module 216.

The content management system 202 may be operable on one or more computing devices, such as server computing devices, personal computing devices, and/or mobile computing devices. Additionally, the external data source interface component 212, the computing device interface component 214, the content management module 216, or any combination thereof may be implemented in a single computing device or across multiple computing devices. Likewise, although the content management data store 210 is illustrated as local to the content management system 202, the data store 210 can correspond to a distributed data store and/or a network based data store. The content management system 202 may include any one of a number of additional hardware and/or software components that would be utilized in the illustrative computerized network environment to carry out the illustrative functions of the content management system 202 and/or any of the individually identified components.

Figure 3A:
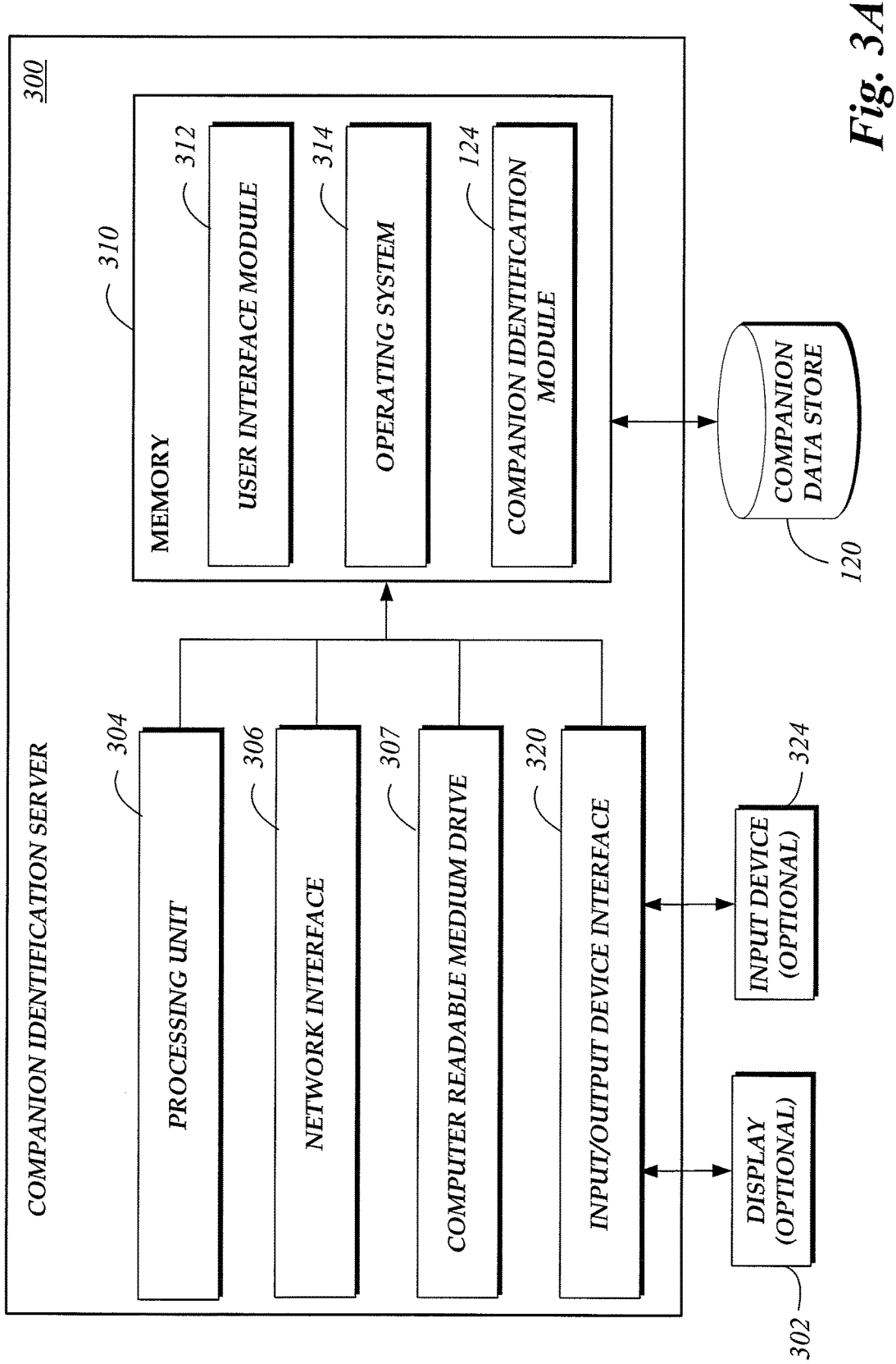
FIG. 3A depicts an illustrative general architecture of a companion identification server for identifying companion content that can be synchronously presented.

FIG. 3A depicts an illustrative general architecture of a companion identification server 300 for identifying companion content. The companion identification server 300 is an example implementation of the companion identification system 102. The general architecture of the companion identification server 300 depicted in FIG. 3A includes an arrangement of computer hardware and software components that may be used to implement aspects of the present disclosure. The companion identification server 300 may include more (or fewer) components than those shown in FIG. 3A. As illustrated, the companion identification server 300 includes a processing unit 304, a network interface 306, a computer readable medium drive 307, an input/output device interface 320, an optional display 302, and an optional input device 324, all of which may communicate with one another by way of a communication bus. The network interface 306 may provide connectivity to one or more networks or computing systems. The processing unit 304 may thus receive information and instructions from other computing systems or services via a network. The processing unit 304 may also communicate to and from memory 310 and further provide output information for an optional display 302 via the input/output device interface 320. The input/output device interface 320 may also accept input from the optional input device 324, such as a keyboard, mouse, digital pen, etc.

The memory 310 may include computer program instructions that the processing unit 304 executes in order to implement one or more embodiments. The memory 310 generally includes RAM, ROM and/or other persistent or non-transitory memory. The memory 310 may store an operating system 314 that provides computer program instructions for use by the processing unit 304 in the general administration and operation of the companion identification server 300. The memory 310 may further include computer program instructions and other information for implementing aspects of the present disclosure. For example, in one embodiment, the memory 310 includes a user interface module 312 that generates user interfaces (and/or instructions therefor) for display upon a computing device, e.g., via a navigation interface such as a web browser installed on the computing device. In addition, memory 310 may include or communicate with one or more auxiliary data stores, such as companion data store 120.

In addition to the user interface module 312, the memory 310 may include a companion identification module 124 that may be executed by the processing unit 304. In one embodiment, the companion identification module 124 implements various aspects of the present disclosure, e.g., determining which pairs/combinations of content are companion content that can be synchronized and/or computing a match score indicative of how well companion content correlates with each other. While the companion identification module 124 is shown in FIG. 3A as part of the companion identification server 300, in other embodiments, all or a portion of the module may be a part of the computing devices 204. For example, in certain embodiments of the present disclosure, the computing devices 204 may include several components that operate similarly to the components illustrated as part of the companion identification server 300, including a user interface module, companion identification module, processing unit, computer readable medium drive, etc. In such embodiments, the computing devices 204 may communicate with a companion data store, such as the companion data store 120, and the companion identification server 300 may not be needed in certain embodiments.

Figure 3B:
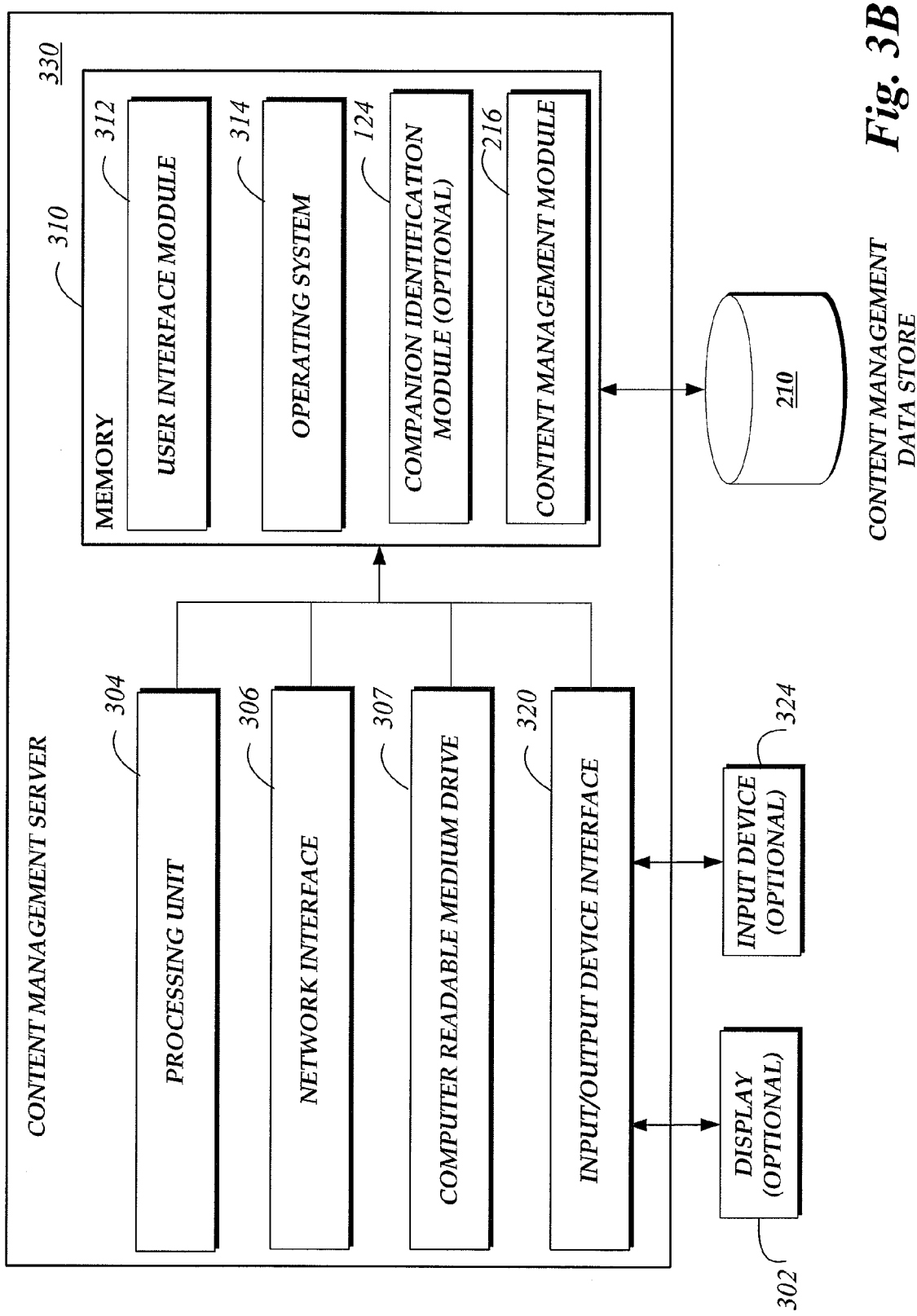
FIG. 3B depicts an illustrative general architecture of a content management server for providing content synchronization information to one or more computing devices.

FIG. 3B depicts an illustrative general architecture of a content management server 330 for managing content synchronization information. The content management server 330 is an example implementation of the content management system 202. The general architecture of the companion identification server 330 depicted in FIG. 3B can include any combination of the features of the companion identification server 300, for example, as described in reference to FIG. 3A, where like reference numbers indicate like parts.

The memory 310 of the content management server 330 may also include a content management module 216 that may be executed by the processing unit 304. The memory may also communicate with the content management data store 210. In one embodiment, the content management module 216 implements various aspects of the present disclosure, e.g., identifying a content match, identifying a device for which to transmit content synchronization information, causing transmission of content synchronization information, or any combination thereof. While the content management module 216 is shown in FIG. 3B as part of the content management server 330, in other embodiments, all or a portion of a content management module may be a part of one or more computing devices 204. For example, in certain embodiments of the present disclosure, the computing devices 204 may include several components that operate similarly to the components illustrated as part of the content management server 330, including a user interface module, content management module, processing unit, computer readable medium drive, etc. In such embodiments, the computing devices 204 may communicate with a content management data store, such as the content management data store 210, and the content management server 330 may not be needed in certain embodiments.

Figure 4A:
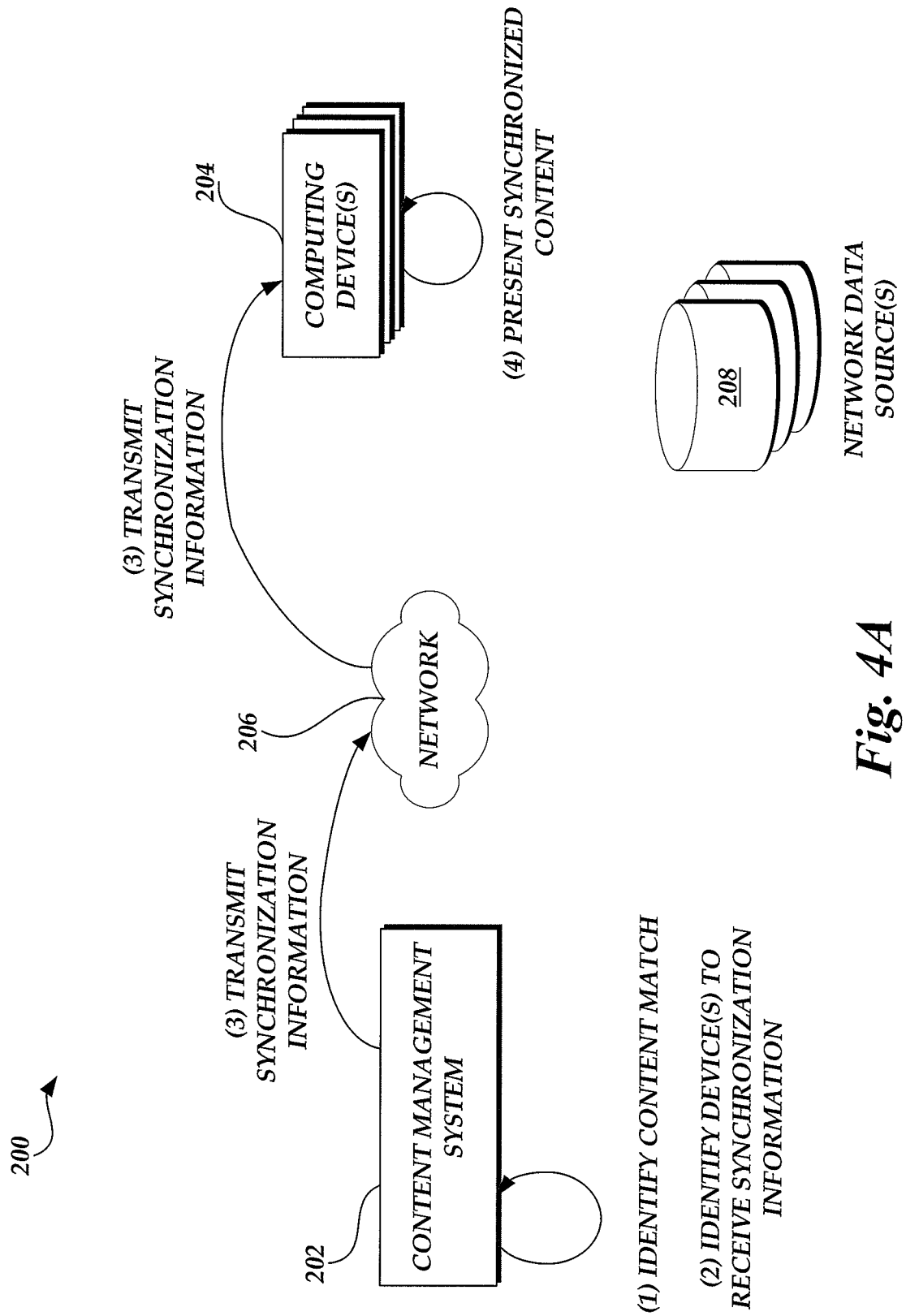
FIGS. 4A and 4B are block diagrams of the content management environment of FIG. 2 illustrating various embodiments for the transmission of synchronization information based on an identified match between first content and second content.
Figure 4B:
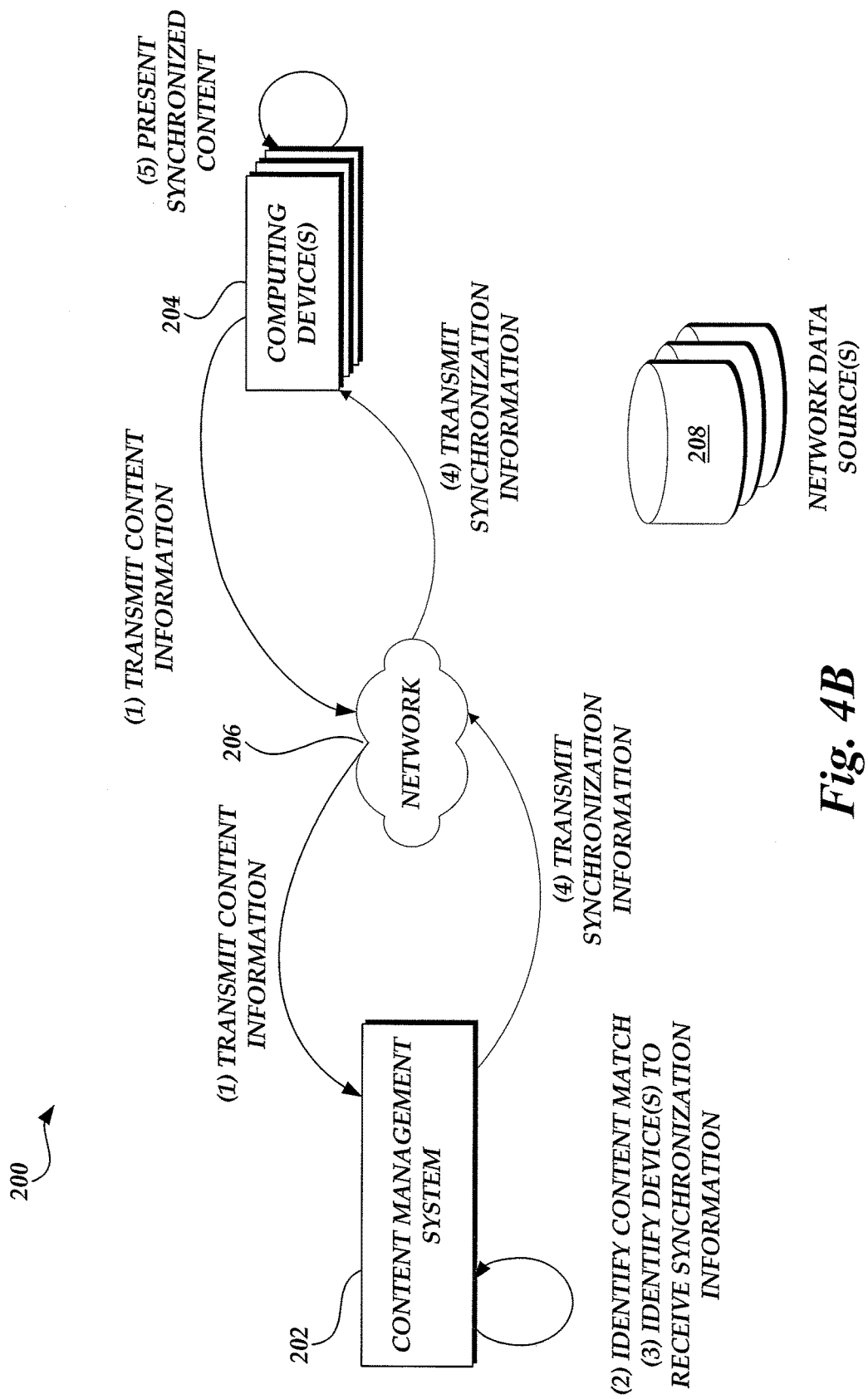

With reference to FIGS. 4A and 4B, the interaction between the various components of the content management environment 200 (FIG. 2) will be described. More specifically, with reference to FIG. 4A, embodiments in which synchronization information is provided at the direction of the content management system 202 will be described. With reference to FIG. 4B, embodiments in which synchronization information is provided at the direction of a computing device 204 will be described.

Due to the decoupled nature of companion content, the content management system 202 can gather content information in a variety of ways and/or at a variety of points in time, in order to identify a content match and/or to identify a particular computing device 204 to which to transmit synchronization information. Synchronization information may include content synchronization information and/or information identifying one or more companion content pairs. The content management system 202 may obtain content information, via the network 206, from network data sources 208 that have access to content information associated with a user and/or information associated with computing devices associated with the user. Similarly, the content management system 202 may obtain content information, via the network 206, from one or more computing devices 204 associated with the user. For example, the content management module 216 may obtain information related to user access to content (e.g., digital ownership history), information related to a user account (e.g., content and/or devices associated with the account), and the like. Such content information may be gathered at the direction of the content management module 216 based on a triggering event. Example triggering events may include, but are not limited to, a change in the user's interaction with content information (e.g., changing privacy settings, updating account information, etc.), a user initiated request, a user purchasing, leasing, sharing, or transferring new content, a user adding content to a new computing device, the content management system 202 identifying that new companion content is available, and the like. Alternatively or additionally, the content management module 216 may gather content information periodically, for example, at predetermined periods of time (e.g., set as a system default or selected at the direction of a user), each time a computing device is activated/deactivated (e.g., when a device is associated with a user account), each time a computing device is powered on/off, and the like. For instance, a computing device 204 may transmit a list of content stored thereon at predetermined intervals (every day, week, two weeks, month, etc.) to the content management system 202 via the network 206. Content information may also be transmitted to the content management system 202 at the direction of a user. Using any combination of these ways of gathering content information, content information for decoupled content can be made available to a common computing system, such as the content management system 202, for identifying content matches. Accordingly, content matches can be determined for potential companion content that is stored on separate computing devices 204, acquired via different transactions (e.g., at different points in time or from different retailers), and the like.

Identifying content matches for decoupled content can vary based on how the content is decoupled. For example, when companion content is decoupled by being purchased at a different point in time from a common retailer, a content match may be identified by the content management system 202 in response to a user buying new content from the common retailer, based on the user's digital ownership history. As another example, when companion content is decoupled by being purchased from different retailers, the content management system 202 can gather information from the different retailers/content providers/distributors and/or from user computing devices storing the content to identify a content match. In yet another example, metadata of content associated with the user can be gathered and analyzed by the content management system 202 to identify content matches for any content that has been decoupled.

Referring to FIG. 4A, once content information for decoupled content is available to the content management system 202, the content management module 216 can identify a content match. Content matches can be identified in response to gathering new content information. Content matches may be identified at predetermined intervals of time (e.g., every day, week, etc.). Alternatively or additionally, content matches can be identified from information available to the content management system 202 on demand in response to a user request or system generated event obtained via the network 206.

The content management module 216 can identify content matches in a variety of ways. The content management module may identify a content match based on comparing metadata and/or a content identifier for each pair of content associated with or owned at a particular time by a user to a list of companion content, for example, as generated by the companion identification module 124. In some implementations, the content management module 216 can identify content matches based on comparing match scores of content pairs (e.g., as computed by the companion identification module 124) to a predetermined threshold. The content management module 216 may also identify whether pairs of content can be synchronized by correlating the digital representations of pairs of content.

After identifying a content match, the content management module 216 may identify a receiving computing device to receive synchronization information. In some instances, the receiving computing device can be a computing device 204 that has provided content information to the content management system 202. In other instances, the receiving computing device may be a different computing device 204 that has not provided content information to the content management system 202. The receiving device may receive synchronization information without obtaining access to any portion of content of a companion content pair associated with the synchronization information and/or prior to obtaining access to any portion of content of a companion content pair associated with the synchronization information. In certain instances, the receiving computing device may request the content synchronization information. The receiving computing device may be associated with a user, user account, or group of users associated with the content match. For example, the content management module 216 can associate a user with the content match by identifying, using content information for the first and second contents, that the user has access to both contents in a companion content pair that make up the content match. Further, the receiving computing device may be configured to synchronously present the companion content. Yet, in some implementations, one or more receiving computing devices may synchronously present companion. The receiving computing device may also be determined based on available content synchronization information and/or compatibility with the receiving computing device. Still further, the receiving computing device may locally store the companion content on memory or stream the content from one or more network resources.

The content management module 216 can cause any portion of the synchronization information (e.g., at least a portion of the content synchronization information) to be transmitted from the content management system 202 and/or the content management data store 210 to the receiving computing device 204 via the network 206. Synchronization information, or any other information transferred via the network 206, may be encrypted or otherwise protected utilizing any number of digital rights management techniques. For instance, synchronization information can be encrypted when content associated with the synchronization information is encrypted. In some implementations, synchronization can be encrypted using information indicative of a device or a group of devices such that an identifier stored on a device receiving the synchronization information can be used to decrypt the synchronization information. The synchronization information can be stored remotely from the receiving computing device 204, for example, in the content management data store 210. When data is stored remotely from the receiving computing device, the content synchronization information can be streamed on the receiving computing device. Alternatively or additionally, the content synchronization information may also be stored locally on the receiving computing device. This can allow the receiving computing device to synchronously present companion content when it is off-line.

With access to synchronization information that includes content synchronization information, the receiving computing device 204 can synchronously present companion content. Synchronously presenting companion content can include, for example, displaying the text of an e-book while playing the corresponding audio book. More details regarding synchronous presentation of companion content will be provided with reference to FIGS. 7-9.

Alternatively or additionally, with access to the synchronization information regarding a companion content pair, the receiving computing device can use the information identifying the companion content pair for a variety of purposes, such as generating content synchronization information, generating a message that the receiving device has access to companion content, and the like. For example, the receiving device may receive a list of companion content pairs to which the receiving device has access. Using the list, the receiving device can then generate content synchronization information for a companion content pair, for example, using any combination of features described herein. Further, the information identifying companion content pairs may also include match scores, which can be used to generate content synchronization information, as described above.

Referring to FIG. 4B, the content management module 216 can indentify a content match at the direction of a computing device 204. The computing device 204 can transmit content information to the content management system 202 via the network 206. This can provide the content management system 202 with content information related to at least one content in a companion content pair. By receiving content information from the computing device 204, the content management system 202 can obtain content information for a second content of a companion content pair so that the content management system 202 can identify a content match. In some instances, the content management system 202 may obtain access to content information for the first content from the computing device 204, one or more other computing devices, and one or more network data sources 208, or any combination thereof. The content information for the first content and the content information for the second content may be obtained at different points in time.

The content management module 216 can identify a content match in response to obtaining content information from the computing device 204, for example, using any combination of features described with reference to FIG. 4A. After identifying the content match, the content management system 202 can transmit synchronization information to one or more receiving devices, which may include the computing device 204 that transmitted content information. Using content synchronization information included in the synchronization information, a single computing device can synchronously present companion content. For instance, an e-book can synchronously present text of while playing a corresponding audio book. In other implementations, multiple devices can synchronously present content. For instance, an e-book reader can present text while a media player synchronously plays a corresponding audio book.

In another embodiment, the computing device 204 can identify a content match based on content stored thereon and/or content information obtained, via the network 206, from other computing devices 204 and/or network resources 208. The computing device 204 can then send a request for content synchronization information to the content management system 202 via the network 206. In response to the request, the content management system 202 can transmit content synchronization information to one or more computing device 204 via the network 206.

According to another embodiment, the computing device 204 can identify a content match and generate the content synchronization information. Alternatively or additionally, the computing device can use a list of companion content pairs included in the synchronization information to generate content synchronization information. In some instances, the computing device can generate the content synchronization information based on a metric indicative of how well content in a potential companion content pair correlates, such as the match score described above. When the metric satisfies a predetermined threshold, the content synchronization information can be generated. In some instances, the content synchronization information can be generated in "real time." The computing device 204 can further be configured to transmit any portion of the content synchronization information to another computing device. Moreover, multiple computing devices 204 can identify a content match and/or generate content synchronization information. The content synchronization information generated by one or more computing devices 204 can be stored locally on the one or more the computing devices 204 and/or in an external data store, such as the content management data store 210.

Figure 5:
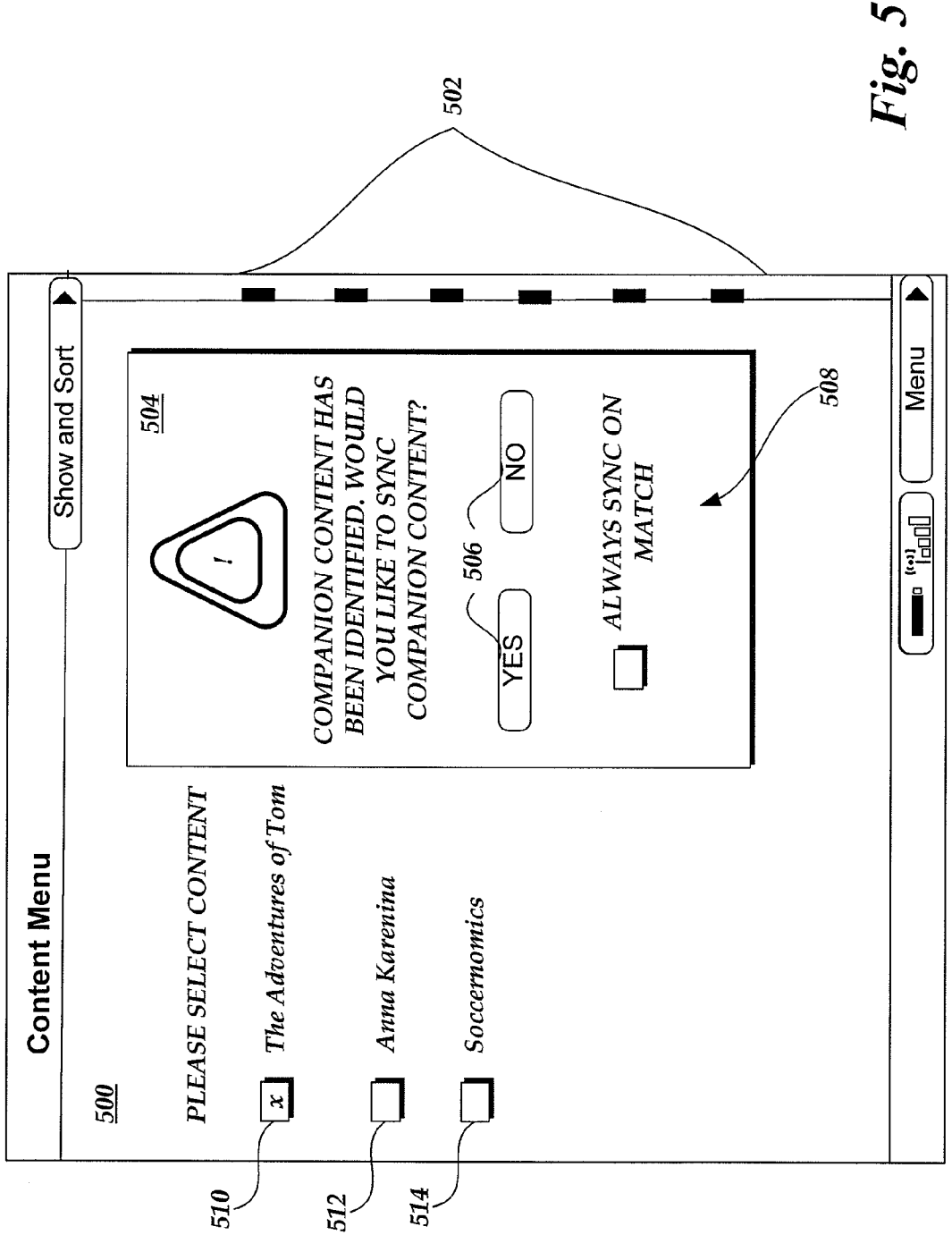
FIG. 5 is an illustrative interface generated on a computing device for selecting options related to an identified content match.

FIG. 5 is an illustrative interface 500 generated on a computing device 204, such as a computing device that can synchronously present companion content, for selecting options related to a content match identified by the computing device 204. The interface 500 can include a first portion 502 for presentation of available content. The user may select content (e.g., an e-book) via one or more selection elements 510, 512, 514 presented by the interface 500. In response to the selection of content, the computing device 204 may determine whether the user has access to companion content. The computing device 204 may obtain content synchronization information (e.g., from a content management system 202 and/or by generating content synchronization information itself) and/or obtain access to another content that is part of a companion content pair that includes the selected content. The computing device 204 may prompt a user to confirm a desire to synchronously present content companion content and/or to configure the computing device for future preferences related to synchronously presenting companion content. As illustrated in FIG. 5, the interface 500 can include a second portion 504 that presents a notification indicating that there is available companion content that can be presented synchronously with the selected content. Additionally, the second portion 504 can include a control 506 for obtaining a confirmation from the user of his or her desire to synchronously present companion content. Still further, the second portion 504 can include one or more configuration elements 508 for enabling the user to configure the criteria upon which the computing device 204 will automatically synchronize companion content. The configuration elements 508 may also enable the user to a default based a degree of a content match. For example, the user can select to always synchronize companion content on a strong match, as indicated by a match score satisfying a predetermined threshold. Although FIG. 5 has been illustrated with regard to a combination of confirmation and configuration functionality, one skilled in the relevant art will appreciate that any number of separate or combined interfaces can be used to collect the confirmation information or configuration information. Additionally, although interface 500 is illustrated with regard to a display screen of a computing device 204, the interface 500 may be generated by any type of computing device and modified in accordance with resources associated with such alternative computing devices.

Figure 6:
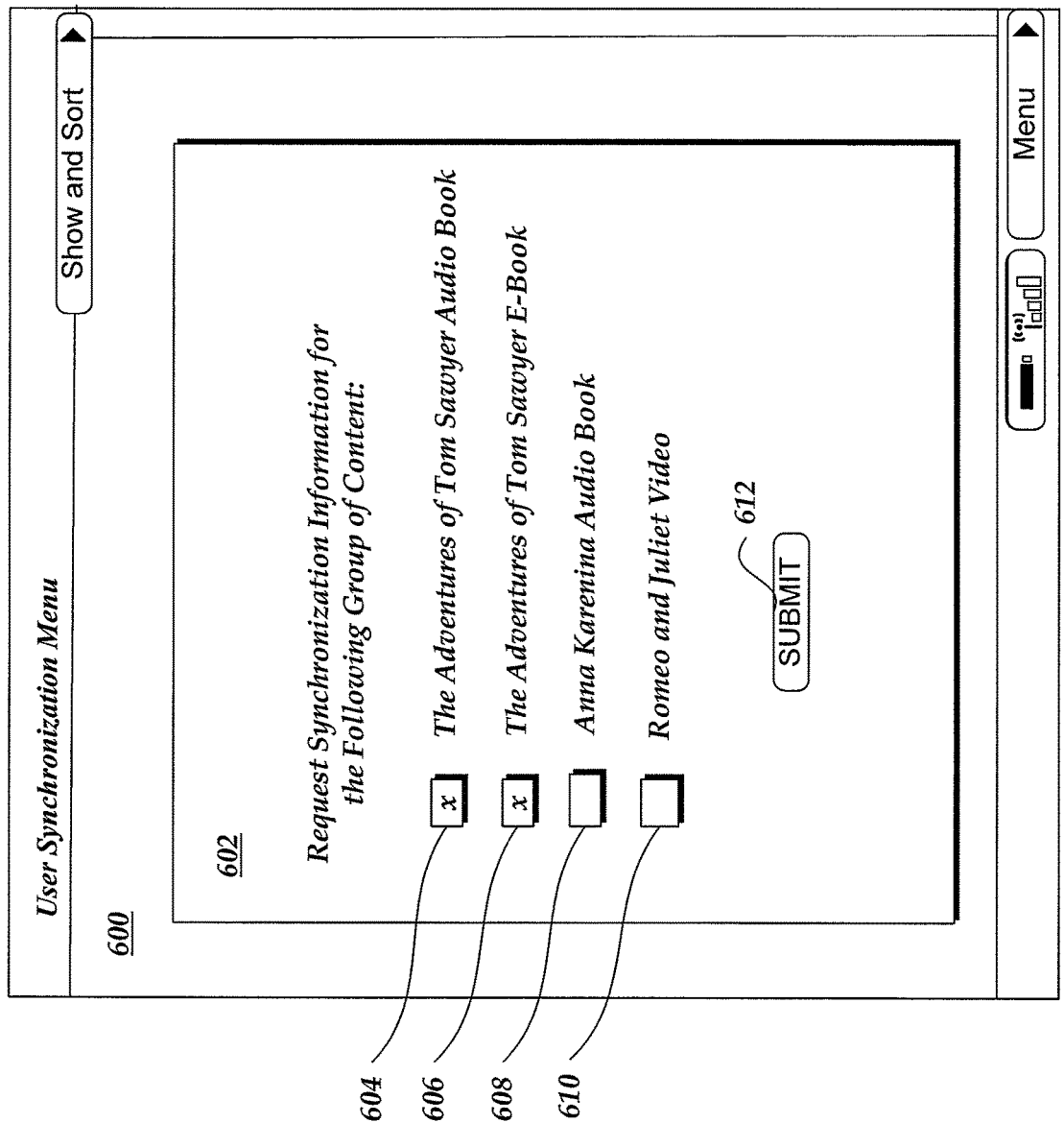
FIG. 6 is an illustrative interface generated on a computing device for requesting content synchronization information for selected content.

FIG. 6 is an illustrative interface 600 generated on a computing device 204 that can synchronously present companion content. The interface 600 identifies a content match at the direction of a user. With reference to FIG. 6, the interface 600 includes a presentation portion 602 that identifies the content available to the user using the computing device 204. In the illustrated example, a list of available content is presented to the user. The available content can include any combination of companion content described herein, as well as content for which no companions have been identified. The available content may include companion content in a number of different versions and/or formats (e.g., e-book, audio book, page image, etc.). Selection elements 604, 606, 608, 610 can enable a user to identify a content match and/or select one or more contents for which to request content synchronization information. The content synchronization information can then be used to synchronously present companion content. For example, as illustrated in FIG. 6, a user can select a first content, e.g., an audio book of *The Adventures of Tom Sawyer*, and a second content, e.g., an e-book of the same. Then the user may submit a request for content synchronization information via a submission element 612. In response to the submission, the computing device 204 may verify that the selected first and second content can be synchronized. In some implementations, the computing device 204 can further generate content synchronization information for the first and second content. In other implementations, the computing device 204 can transmit a request related to the content synchronization information to one or more other computing devices (e.g., to the content management system 202) via a network (e.g., the network 206). Such a transmission can include a request to determine whether the first and second content are a content match and/or a request for the content synchronization information for the first and second content.

Figure 7:
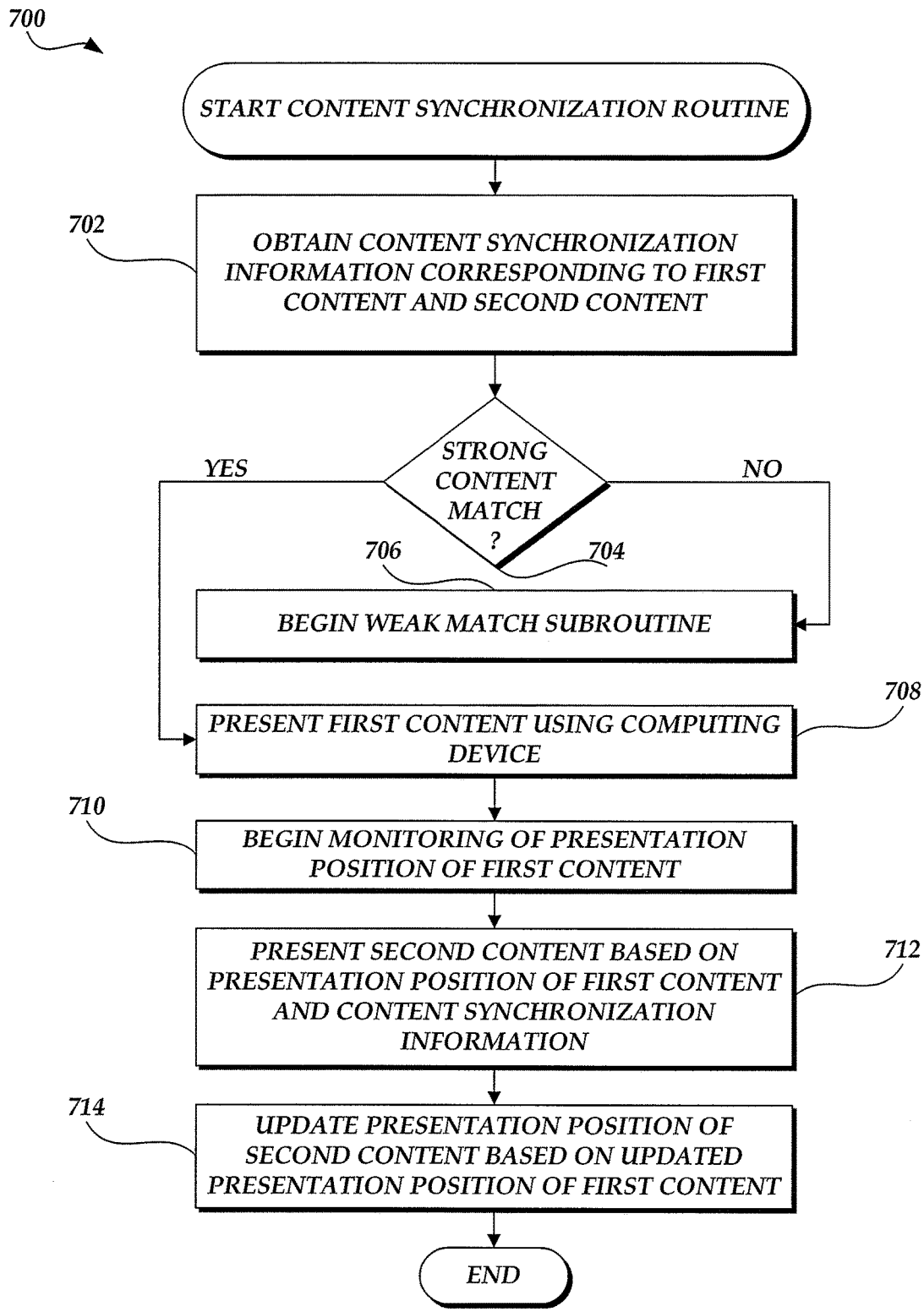
FIG. 7 is a flow diagram of an illustrative method of presenting synchronized content.
Figure 8:
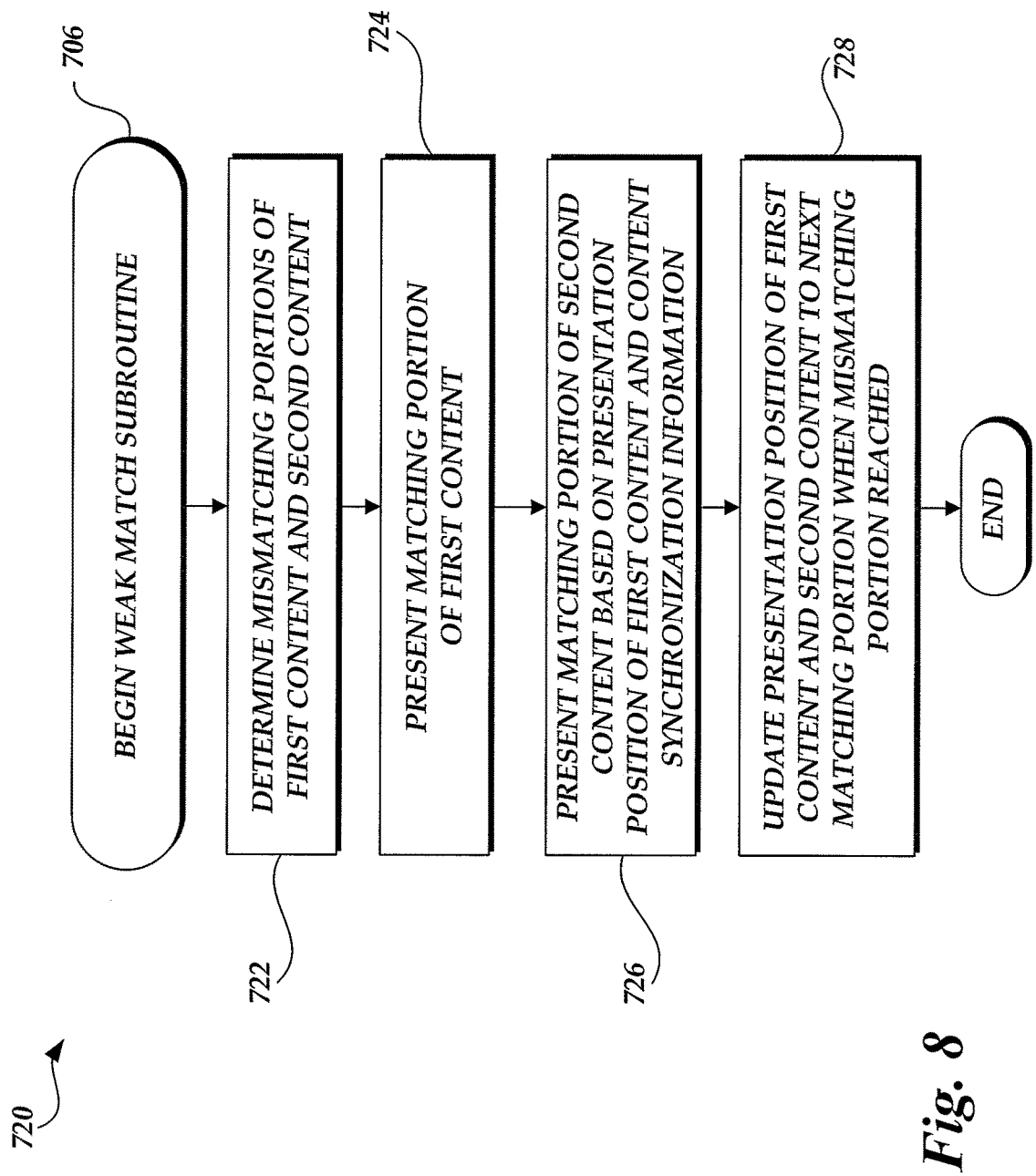
FIG. 8 is a flow diagram of an illustrative method of rending synchronized content that includes mismatches in companion content.

Once a computing device 204 has obtained content synchronization information associated with a content match of a first content and a second content, the computing device 204 can synchronously present the first content and the second content to a user. FIGS. 7 and 8 depict illustrative methods of synchronously presenting companion content. Although these illustrative methods describe synchronously presenting a pair of companion content, the features described with reference to these illustrative methods can be applied to synchronously presenting a larger combination of companion content.

Referring to FIG. 7, a flow diagram of an illustrative method 700 of synchronously presentation companion content will be described. At block 702, a computing device 204 can obtain content synchronization information corresponding to a first content and a second content. The content synchronization information may be obtained, for example, from a data store (e.g., data store 210) and/or a separate computing device. Alternatively or additionally, the content synchronization information may be obtained by the computing device 204 generating the content synchronization information. As previously described, the content synchronization information can include information regarding positions in the first content that correspond to positions in a second content (e.g., a page and line in an e-book and a playback position of an audio book), additional information related to synchronous presentation (e.g., information for highlighting, underlining, etc. a portion e-book that corresponding to the playback of an audio book), information identifying portions of the first and second content that match/mismatch (e.g., information identifying portions of an unabridged e-book that do not correspond to an abridged audio book), or any combination thereof.

At decision block 704, a test may be conducted to determine to what degree companion content matches with each other. For example, the test can include determining whether a content match score satisfies a predetermined threshold. As previously described, the companion identification module 124 can be configured to determine a content match score indicating how well a content pair of companion content correlate with each other. Companion content can be divided into any number of subdivisions based on content match scores. For example, a companion content pair associated with a content match score that satisfies a predetermined threshold can be considered a strong match. In this example, a companion content pair associated with a content match score that does not satisfy the threshold can be considered a weak match. The threshold can be determined programmatically by one of more computing devices and/or set/adjusted at the direction of a user.

If the content match is determined to be weak match, a weak match subroutine can begin at block 706. More detail regarding the weak match subroutine will be provided with reference to FIG. 8. Alternatively, if the content match is determined to be a strong match, the first content can be presented using a computing device 204, at block 708. The first content can be presented in any manner that the computing device 204 is capable of presenting content, such as visually, aurally, tactilely (e.g., via mechanical vibrations and/or by presenting Braille), or any combination of thereof. The first content may be any type of content described herein, for example, an audio book. Further, the first content may include only a portion of a work, for example, a chapter of an audio book.

At block 710, a computing device 204 can begin monitoring a presentation position of the first content. The presentation position may be a reference point or tracking point associated with the first content. For example, the presentation position may represent a textual position, a playback position, and/or any other indicator of a position of the first content that is being presented. In a specific example, the textual position may correspond to a page or any other unit of text within the first content. In another specific example, the playback position may correspond to units of time (e.g., seconds) from a starting point.

The presentation position of the first content can used in combination with content synchronization information to determine a corresponding presentation position in the second content. For example, the content synchronization information may be used to map a presentation position of the first content to a corresponding presentation position in the second content. In some instances, the content synchronization information can include a map of reference points in the first content that correspond with reference points in the second content, which can be used to determine a presentation position in the second content.

The second content can be synchronously presented with the first content based on the presentation position of the first content and the content synchronization information at block 712. Like the first content, the second content can be any of the content described herein and presented in any manner that a computing device 204 is capable of presenting the second content, such as visually, aurally, tactilely, or any combination of thereof. The second content may be, for example, an e-book. In addition, the second content may include only a portion of a work, for example, a chapter of an e-book. In some instances, the second content can be presented using the same computing device used to present the first content. In other instances, the second content is presented using a separate computing device in communication with the computing device that presents the first content.

At block 714, the presentation position of the second content can be updated based on a presentation position of the first content. For example, as the presentation position of the first content changes, the computing device 204 can determine a corresponding presentation position for the second content using the synchronization information. Based this determination, the presentation position of the second content can be synchronized with the presentation position of first content. In a specific example, this may include turning the page of an e-book when the playback of an audio book has advanced beyond the text associated with a page being displayed or to the end of the text associated with the page being displayed. The presentation position of the second content can be continually updated based on the presentation position of the first content to enable an enhanced user experience of synchronously consuming the first content and the second content. When the first content and/or the second content include only a portion of a work, the computing device 204 can disable synchronous presentation of companion content for portions of the first content and second content that content synchronization information indicates do not correspond to each other.

Referring to FIG. 8, a flow diagram depicting an illustrative method 720 of synchronously presenting companion content that are a weak match, e.g., because the companion content includes content mismatches, will be described. As previously described, companion content pairs may include mismatches between some portions of content in a companion content pair. The method 720 may be performed to present companion content considered to be a content match, but having a relatively low degree of correlation, for example, as determined at decision block 704 of the method 700. Accordingly, method 720 can be implemented in connection with any combination of features of method 700.

The illustrative method 720 may begin at block 706 and proceed to block 722, where mismatching segments of the first content and the second content are determined. Alternatively or additionally, matching segments of the first content and the second content can be determined. These mismatching/matching segments of content can be determined using the content synchronization information. For instance, the content synchronization information may include reference or tracking points at which portions of the first content and the second content begin to correlate with each other and/or stop correlating with each other. This information can be used to identify portions of the potential companion content that mismatch.

A portion of first content that matches the second content can be presented at block 724. Then, at block 726, a portion of the second content can be synchronously presented based on the presentation position of the first content and the content synchronization information. The presentation position of the second content can be continually updated based on the content synchronization information and the presentation position of the first content, for example, as previously described. When a mismatching segment is reached by the first content, the presentation position of both the first content and the second content can be updated to the next matching segment at block 728. In this way, the method 720 can continue to synchronously present the first content and the second content even when a significant portion of either content does not match with the other content. In another implementation, when a mismatching portion in either content is presented, synchronous presentation can be disabled until a matching portion is presented, at which point synchronous presentation can resume.

FIG. 9 illustrates an example of a computing device 204 synchronously presenting companion content, such as an e-book and a corresponding audio book. As illustrated in FIG. 9, the computing device 204 can visually present text of the e-book on a display 900. The computing device 204 can also aurally present the companion audio book simultaneously via one or more speakers 902 and/or one or more audio outputs, which may be provided to external speaker(s) such as headphones. Content synchronization information may be used to synchronously present and update the presentation position of both the audio book content and the visual e-book content. This may include, for example, any combination of features described in reference to the methods 700, 720 described in reference to FIGS. 7 and 8, respectively.

In addition, the computing device 204 may also present an indicator 906, which can indicate a presentation position of the audio book content in relation to the visual presentation of the e-book content within the visual presentation of the e-book. For example, the text of the e-book presented using the display 900 can be enhanced to indicate the playback position of the audio book presented via the speaker 902. In this regard, text can be highlighted, underlined, and/or presented in different font (e.g., using different color, size, type, effect, etc.). Individual words, lines, sentences, and/or other units of text can be enhanced to indicate an audio playback position. When the playback of the audio book reaches the end of a page of the e-book being presented, the next page of the e-book can be displayed automatically using the content synchronization information.

In some implementations, a user can select any word or group of words of a page of an e-book presented on the display 900 and start playback at a corresponding point in the audio book. Alternatively or additionally, the user can navigate to any point in time in the audio book, and the corresponding page of the e-book can be displayed by the computing device 204, and/or the user can navigate to any position in the e-book and playback of the audio book can begin at the corresponding point in the audio book.

The computing device 204 can also support search and bookmarking functionalities, maintaining the synchronous presentation of both the audio book and the e-book. The computing device 204 can monitor both audio and visual presentation positions, so a user can switch between textual display and audio playback, and resume consumption of the other form of content from the last position.

In some embodiments, a companion content pair may include a first content, such as visual or textual content associated with a book or other written work, and a second content that includes recorded narration audio content, such as an audio recording of a person reading the first content aloud. As one example, the person reading the first content aloud may be a user who wishes to record his voice reading a children's book to his daughter for either contemporaneous playback or future playback to his daughter in synchronization with the first content (in this example, an electronic version of the children's book). In some such embodiments, aspects of the present disclosure may generate content synchronization information for such a content pair in real time or substantially in real time as the narration audio content is being recorded and/or as the narration audio content is received from the narrator's computing device. The generated content synchronization information may then enable one or more computing devices to synchronously present the recorded narration audio content with the companion content, such as by transmitting the content synchronization information and the narration audio content to a listener's computing device, as further described below. In some embodiments, the synchronized content may be presented on the same computing device that records the narration audio content. In other embodiments, the synchronized content may be presented by a second computing device remote from the narrator's computing device.

As previously discussed, content synchronization information can include reference points mapping portions of the first content to corresponding portions of the second content. For example, content synchronization information can include data that can be used to map a segment of text (e.g., a word, line, sentence, etc.) to a timestamp of the narration audio recording. The content synchronization information can also include information related to the relative progress of the presentation, or a state of presentation of the visual and/or textual representation of the content. As discussed above, the content synchronization information can be generated in a variety of formats or versions, and may include a match score and/or a passage mismatch score, as described above.

Figure 10:
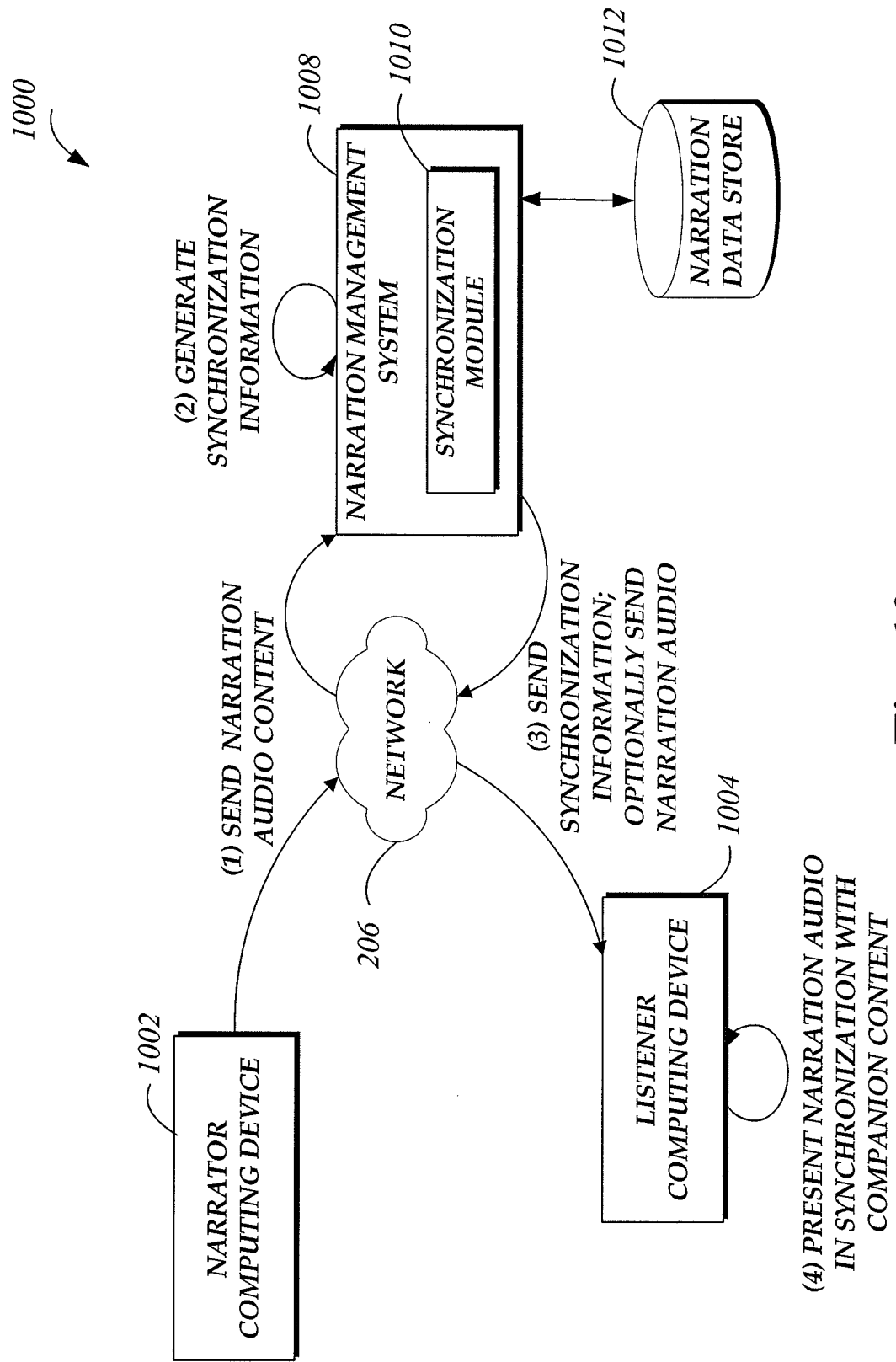
FIG. 10 is a block diagram depicting an illustrative operating environment in which a narration management system generates synchronization information for narration audio content received from a narrator computing device, and sends the synchronization information to a listener computing device for synchronous presentation of the audio content and companion content.

FIG. 10 is a block diagram depicting an illustrative operating environment 1000 in which a narration management system 1008 generates synchronization information for narration audio content received from a narrator computing device 1002 via a network 206, and sends the synchronization information to a listener computing device 1004 for synchronous presentation of the audio content and companion content. The narrator computing device 1002 may be operated by an individual that reads aloud from a first content, such as an e-book presented for display by the narrator computing device, while the narrator computing device 1002 records the narrated audio via a microphone or other input device capable of receiving audio data. In the illustrated embodiment, the narrator computing device 1002 sends the recorded narration audio content to the narration management system 1008 via the network 206. In some embodiments, the narrator computing device may stream the audio content to the narration management system as the audio content is recorded, such that the narration computing device may receive the narration computing device in real time or near-real time as the first content is read aloud by the operator of the narrator computing device. In other embodiments, the narrator computing device may compress or otherwise process the recorded audio content prior to sending portions of the processed audio content to the narration computing system. For example, the narrator computing device may send the audio content in packets or portions at certain time intervals (such as every 10 seconds, 30 seconds, one minute or other time period) or at certain breaks in the first content and/or in the recorded audio content (such as when a brief silence or pause is detected in the recorded audio, or when the user selects to move to a new sentence, line, paragraph, page, chapter, or other portion of the first content while reading aloud).

Once the narration management system 1008 receives the narration audio content, the synchronization module 1010 of the narration management system generates content synchronization information for the narration audio content and the companion content (in this case, the first content from which the narrator was reading). In some embodiments, the companion content, such as an e-book or other source content from which the narrator was reading, may be identified in information received by the narration management system from the narrator computing device 1002. In other embodiments, the companion content may be determined based on one or more methods discussed above. For example, the narration management system may translate at least a portion of the audio content into a specific e-book format and/or into a generic format (e.g., text) using known speech recognition techniques. The translated content information can then be compared or correlated with other content information (such as the text of a number of different e-books or other potential companion content) to determine whether each pair of content is companion content that can be synchronized. The companion content may be retrieved by the narration management system 1008, for example, from one or more data stores, such as narration data store 1012. In other embodiments, the companion content may be received from the narrator computing device 1002 or some other computing device.

Given the narration audio content and the corresponding companion content (such as an e-book, transcript text or other content), the narration management system 1008 may generate the content synchronization information in various ways, depending on the embodiment. For example, the synchronization module 1010 may translate the audio content to text content representing the spoken words using known speech-to-text methods. Depending on the format of the companion content, the synchronization module 1010 may convert the companion content to text content, such as by applying optical character recognition ("OCR") to image data of the companion content. The synchronization module may then match the converted text content to corresponding portions of the companion content from which the narrator was reading. For example, in some embodiments, the synchronization module may store information associating each word of the companion content with the start time (and optionally a length or end time) of the corresponding spoken word in the narration audio content. In other embodiments, the synchronization module may determine and store byte locations of spoken words in the stored audio data that correspond to words of text included in the companion content. In some embodiments, associations may be stored at a less granular level than the word level, such as by sentence or line of the companion content, or at a more granular level, such as by syllable or phonetic sound (e.g., "phone").

Narration audio and transcript alignment methods that may be implemented by the synchronization module in generating the content synchronization information are described in more detail in U.S. patent application Ser. No. 12/880,947 (the "'947 Application"), filed Sep. 13, 2010, entitled "SYSTEMS AND METHODS FOR CREATING NARRATION AUDIO," which is hereby incorporated by reference in its entirety. As discussed above, the content synchronization information may be generated even if there are mismatching portions of the audio content and the companion content, such as if the narrator skipped portions of the companion content while reading or spoke additional words than those included in the companion content.

The synchronization module 1010 may, in other embodiments, generate the content synchronization information without converting the recorded audio content to word information. For example, the synchronization module may convert the recorded audio content to phonetic information and compare each recognized phone to expected phonetic information for the companion content. In some embodiments, the synchronization module may determine the expected phonetic information by converting the textual words of the companion content to phonetic information representing how those words would typically be pronounced. In other embodiments, the expected phonetic information may have been previously generated and stored in a data store along with the companion content itself, such as in narration data store 1012.

The phonetic information determined for the audio content and/or the expected phonetic information for the companion content may include probability information indicating the probability that a given phone is accurate or correct. In some embodiments, once a phone mapping or match has occurred between an expected phone in the companion content and a recognized phone in the audio content, the synchronization module may disregard all phonetic information prior to the matched phone when searching for the next match. For example, in situations in which the narrator reads through the companion content in order from start to finish, the narration audio content would typically only move forward through the expected phone information of the companion content, such that the companion content's phonetic information prior to the last recognized reading location may be ignored during phonetic matching analysis. In some embodiments, the synchronization module may limit the number of expected phones in the companion content to compare to a given phone in the audio content, such as by only searching for a match within a certain number of phones (such as ten or twenty, for example) from the last matched phone.

In some embodiments, the content synchronization information may be generated in near real-time during the recording of the narration audio content. In other embodiments, the content synchronization information may be generated after the narrator has finished recording the audio content, paused recording of the audio content, or selected to transmit previously recorded audio content to the narration management system 1008 or listener computing device 1004.

In the embodiment illustrated in FIG. 10, once the narration management server has generated and stored the content synchronization information, the narration management server sends the content synchronization information to the listener computing device 1004. The narration management server may additionally or alternatively store the generated content synchronization information and the associated narration audio data in narration data store 1012. In the illustrated embodiment, the listener computing device 1004 presents the narration audio content in synchronization with the companion content based on the synchronization information, as discussed below with reference to FIG. 12. In some embodiments, the listener computing device may receive the narration audio content from the narration management system. In other embodiments, the listener computing device may receive the narration audio content from the narrator computing device 1002, such as in parallel with the narration management system's receipt of the narration audio content from the narrator computing device. In other embodiments, the listener computing device may receive the narration audio content from a microphone or other input device, such as in the case in which the remotely-located narrator is speaking with the listener by phone, video chat or other communications medium via the listener computing device or another device located physically near to the listener computing device.

While FIG. 10 has been described above with reference to an embodiment in which the synchronization module 1010 is a component of the narration management system 1008, the narrator computing device 1002 and/or listener computing device 1002 may, in other embodiments, include a synchronization module, such that a narration management system may not be present in certain operating environments. For example, the narrator computing 1002 and listener computing device 1004 may be in communication with one another via the network 206, and the narrator computing device and/or listener computing device may generate the content synchronization information. In other embodiments, a single computing system may record narration audio content, generate content synchronization information and present the companion content in synchronization with the recorded audio content.

Figure 11:
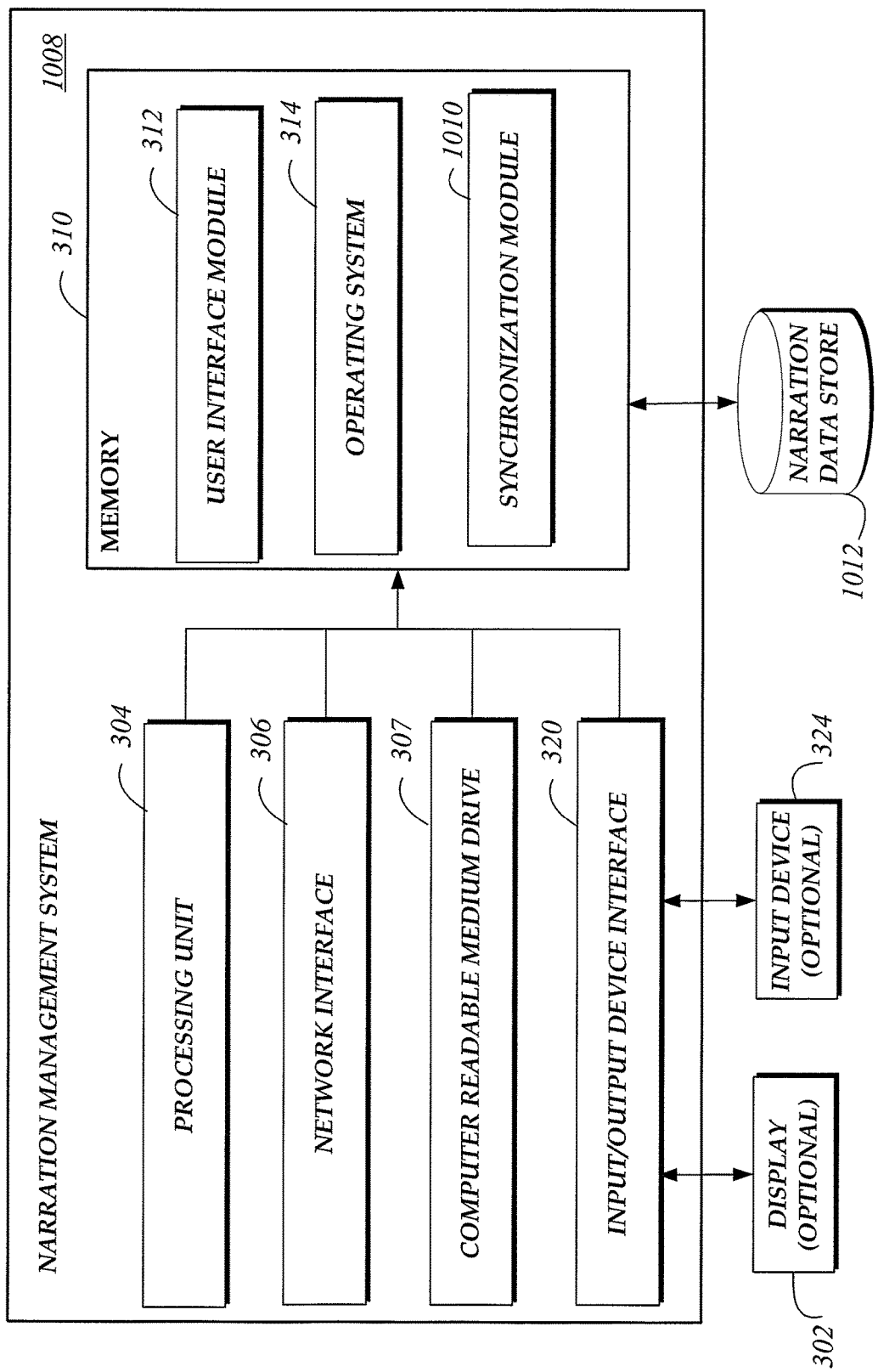
FIG. 11 depicts an illustrative general architecture of a narration management system for generating content synchronization information for recorded narration audio content and corresponding companion content.

FIG. 11 depicts an illustrative general architecture of a narration management system 1008 for generating content synchronization information for recorded narration audio content and corresponding companion content. The general architecture of the narration management system 1008 depicted in FIG. 11 can include any combination of the features of the companion identification server 300, for example, as described in reference to FIG. 3A above, where like reference numbers indicate like parts. The memory 310 of the narration management system 1008 may also include a synchronization module 1010 that may be executed by the processing unit 304. The memory may also communicate with the narration data store 1012. In one embodiment, the synchronization module 1010 implements various aspects of the present disclosure, such as generating content synchronization information for recorded narration audio content and corresponding companion content, as described above. While the synchronization module 1010 is shown in FIG. 11 as part of the narration management system, in other embodiments, all or a portion of a synchronization module may be a part of narrator computing device 1002 and/or listener computing device 1004. For example, in certain embodiments, the narrator computing device 1002 and/or listener computing device 1004 may include several components that operate similarly to the components illustrated as part of the narration management system 1008, including a user interface module, content management module, processing unit, computer readable medium drive, etc. Accordingly, a narration management system may not be needed in certain embodiments.

Figure 12:
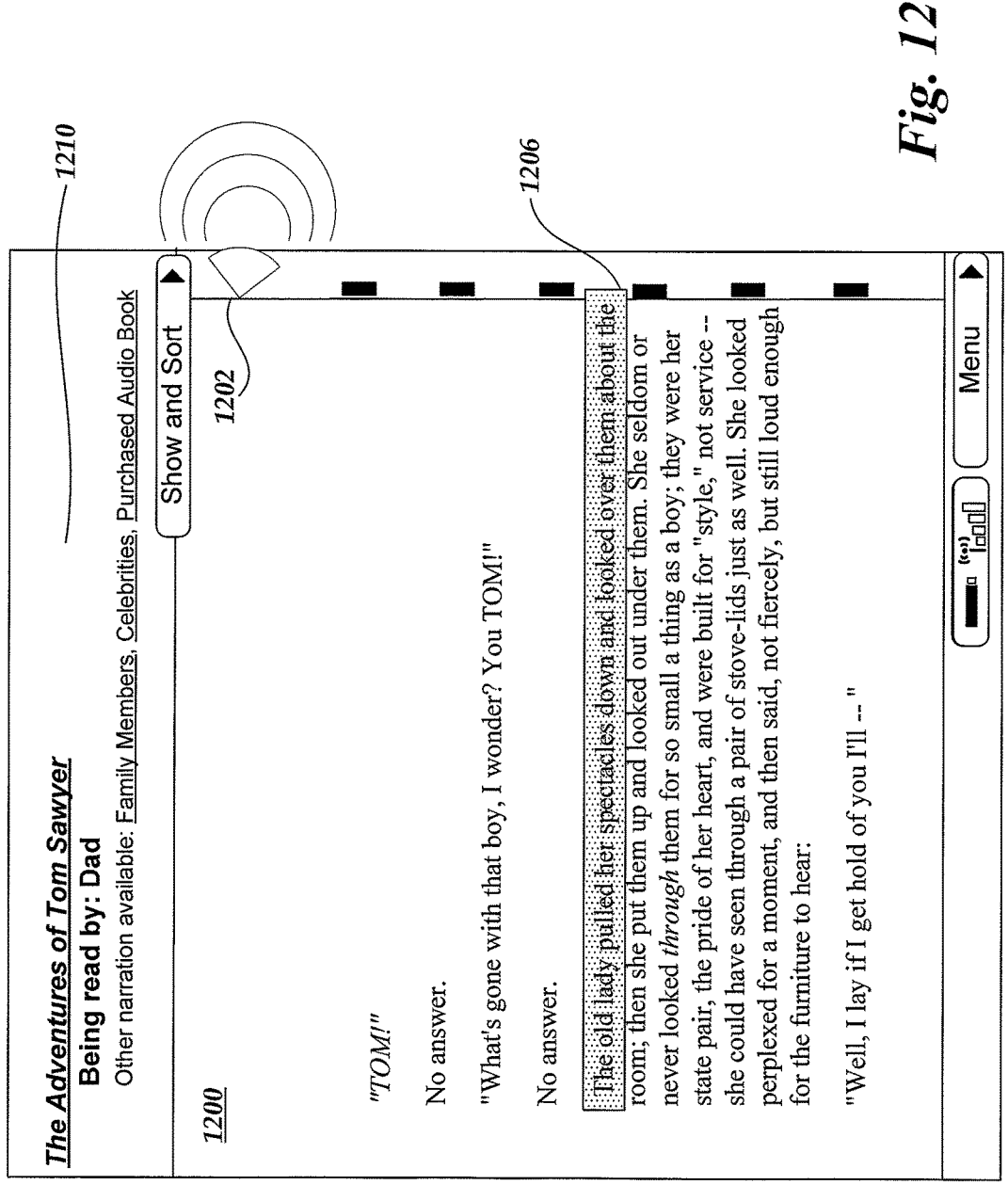
FIG. 12 depicts an illustrative computing device synchronously presenting recorded narration audio content and companion content.

FIG. 12 depicts an illustrative computing device synchronously presenting recorded narration audio content and companion content. While FIG. 12 will be described as an illustrative user interface generated for display by the listener computing device 1004, a similar user interface may be generated for display by the narrator computing device 1002 or narration management system 1008, in other embodiments. As illustrated in text 1210, the user of the listener computing device 1004 is listening to "Dad" read *The Adventures of Tom Sawyer*. "Dad" may be, for example, the listener's father who has recorded himself reading aloud for his daughter from an e-book or other companion content associated with *The Adventures of Tom Sawyer*.

In some embodiments, the listener computing device 1004 may generate the illustrative user interface in real time or near-real time as the father is reading aloud. In other embodiments, the listener computing device 1004 may receive from another computing or retrieve from a data store previously recorded narration audio content for subsequent playback. The listener computing device 1004 may receive the narration audio content from the narrator computing device 1002 or the narration management system 1008, and may aurally present the narration audio content simultaneously with display of the companion content via one or more speakers 1202 and/or one or more audio outputs, which may be provided to external speakers such as headphones. In some embodiment, the listener computing device 1004 may receive the narration audio content via a microphone or other input device, such as if the father is speaking with his daughter by phone or in person.

Similar to the user interface described above with reference to FIG. 9, the listener computing device 1004 may visually present text (and optionally illustrations or other accompanying content) of the e-book companion content on a display 1200. The listener computing device 1004 may aurally present the narration audio content simultaneously via one or more speakers 1202 and/or one or more audio outputs. Content synchronization information received from the narration management system 1008 or the narrator computing device 1002, or generated by the listener computing device 1004, may be used to synchronously present and update the presentation position of both the narration audio content and the visual e-book content. This may include, for example, any combination of features described above, such as in reference to FIGS. 7, 8 and 9. For example, the listener computing device 1004 may present an indicator 1206, which can indicate a presentation position of the narration audio content in relation to the visual presentation of the e-book content. In this regard, text can be highlighted, underlined, and/or presented in a different font (e.g., using different color, size, type, effect, etc.). When the playback of the narration audio content reaches the end of a page of the e-book being presented, the next page of the e-book can be displayed automatically using the content synchronization information.

In some embodiments, the indicator 1206 may move based on a combination of content synchronization information that is being generated in real time and a projected reading pace moving forward. For example, in the case of a time delay between the playback of the narration audio content and the content synchronization information being generated or received by the listener computing device 1004, a synchronization module or other module may determine the pace of reading by the narrator and project the indicator 1206 forward through the content based on the current reading pace. The indicator's position may then be appropriately adjusted as the actual content synchronization information is generated or received by the listener computing device 1004.

As illustrated in FIG. 12, the user of the listener computing device 1004 may select from various audio content that has been synchronized with the given companion content, *The Adventures of Tom Sawyer* e-book. For example, the recording by user "Dad," the listener's father, may be the current audio being listened to by the user of listener computing device 1004. The user may select from other family members, celebrities or other users that have recorded audio for the given book and for which content synchronization information has been generated. The listener may alternatively select a purchased, professionally-recorded audio book version of the given book to be played back instead of user-created narration audio content.

FIG. 13 is an illustrative interface generated for display by a computing device during recording of narration audio content. While FIG. 13 will be described as an illustrative user interface generated for display by the narrator computing device 1002, a similar user interface may be generated for display by the listener computing device 1004 or narration management system 1008, in other embodiments. The illustrative user interface may be displayed, for example, while the narrator computing device 1002 records a user reading aloud from text content or other visual content. As illustrated by text 1310, the user is reading from an e-book version of "Alice's Adventures in Wonderland," and the narration audio data being recorded is being streamed or otherwise transmitted to the computing system of another user, indicated as "Bobby." Bobby may be operating the listener computing device 1004, for example. In some embodiments, the recorded audio content may be sent to the narration management system 1008 for real-time generation of the content synchronization information. In other embodiments, the narrator computing device 1002 may generate the content synchronization information as the audio content is recorded.

As illustrated in FIG. 13, the illustrative user interface includes a notification 1320 indicating that the narrator computing device 1002 has determined that the reader is having trouble pronouncing the word "MARMALADE." Notification 1320 includes pronunciation information and a definition for the word. The progress indicator 1312 indicates that the user's current reading location is at the word "MARMALADE" in the e-book content, which the user may be having trouble pronouncing or have pronounced incorrectly. The narrator computing device 1002 may determine that the reader is having trouble with the word, for example, by detecting a pause in the user's speaking and/or by comparing phonetic information in the recorded audio content with expected phonetic information for the next word in the e-book text content. In other embodiments, definition information, pronunciation information and/or other information regarding a word or phrase may be automatically displayed for certain words that the narrator computing device 1002 predicts the user may not be familiar with, such as based on how common the word is, whether it appears in one or more dictionary files, the reading level of the user, and/or other considerations. The user may select the continue option 1322 to close the notification 1320 or may select option 1324 to turn off the word help feature. In some embodiments, similar notifications may be presented to a listener, such as a child listening to narration audio content recorded by a parent, in order for the listener to learn what a word means or learn other information about a word or phrase appearing in the companion content.

While aspects of the present disclosure have been described herein with reference to narration audio content that is synchronized with book content, such as an e-book, narration audio content may be synchronized with a number of different types of companion content, in certain embodiments. For example, in a legislative meeting in which individuals read aloud from a bill or other document, listeners may follow along on a computing device that synchronously presents the text of the bill or other document. Other examples of companion content to live narration or other spoken content may include a transcript of a political speech, lyrics to a song, a movie or television show transcript, the script of a play, etc.

Although some of the examples were provided in the context of a retail environment in which a user purchases companion content, any combination of features described herein may be applied to other settings, as appropriate. For example, the user need not purchase content of a companion content pair in order to obtain content synchronization information and/or synchronously consume companion content. Instead, the user may obtain access to one or more individual content of a companion content pair by any number of suitable ways, for example, by borrowing, checking out, renting, permanently leasing, temporarily leasing, or any combination thereof. In a specific example, the user may check out an audio book and synchronously present the audio book with an e-book that the user has purchased. In another specific example, the user may lease an audio book and synchronously present the audio book with a borrowed e-book.

Further, although some of the examples were provided in the context of synchronously presenting content, any combination of features described herein may be applied to other content synchronization, as appropriate. For example, content synchronization information can be used to switch back and forth between presenting a first content and a second content. More specifically, in some implementations, a computing device can display the text of an e-book and then switch to playing the audio of an audio book at a corresponding position using the content synchronization information. As another example, the principles and advantages described herein can be used to synchronize companion content on different computing devices outside the context of synchronously presenting companion content. For instance, any combination of features described herein can be applied to any of the examples of synchronizing content on different computing devices such as described in the '473 Application incorporated by reference in its entirety above.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
    as implemented by one or more computing devices configured with specific executable instructions,
        receiving audio content that includes words read aloud from published digital content, wherein the audio content is received at least substantially in real time as the words are read aloud;
        generating content synchronization information for the received audio content and the published digital content, wherein the content synchronization information associates portions of the audio content with corresponding portions of the published digital content; and
        causing visual presentation of the published digital content in synchronization with the received audio content as the audio content is received, wherein causing the visual presentation includes changing portions of the published digital content presented for display to correspond to audio portions received in the audio content, wherein the published digital content is presented in synchronization with the received audio content based at least in part on the generated content synchronization information.

2. The computer-implemented method of claim 1, wherein the audio content is received as a data stream.

3. The computer-implemented method of claim 1, further comprising retrieving the published digital content from a data store.

4. The computer-implemented method of claim 1, further comprising maintaining synchronization of a current position in the presented published digital content as additional audio content is received.

5. The computer-implemented method of claim 4, wherein the current position is visually indicated in the presentation of the published digital content.

6. The computer-implemented method of claim 1, wherein the audio content is received via a microphone or other audio recording device.

7. The computer-implemented method of claim 1, wherein the audio content is received from another computing device.

8. The computer-implemented method of claim 7, further comprising aurally presenting the received audio content in synchronization with the visual presentation of the published digital content.

9. The computer-implemented method of claim 1, further comprising generating for display additional information regarding at least one word in the published digital content based at least in part on a determination that the at least one word was not read correctly in the audio content, wherein the additional information includes at least one of pronunciation information or a definition.

10. A computer readable, non-transitory storage medium storing computer-executable instructions that, when executed by a computer system, configure the computer system to perform operations comprising:
    retrieving published digital content from a data store, the published digital content including text content;
    receiving streaming audio content associated with the published digital content;
    receiving content synchronization information for the audio content and the published digital content, wherein the content synchronization information associates portions of the audio content with corresponding portions of the published digital content; and
    generating for display portions of the published digital content in synchronization with aural presentation of the streaming audio content as the streaming audio content is received, wherein the portions of the published digital content displayed are changed to correspond to portions of the streaming audio content aurally presented, wherein the published digital content is presented in synchronization with the streaming audio content based at least in part on the received content synchronization information.

11. The computer readable, non-transitory storage medium of claim 10, wherein the instructions further configure the computer system to visually distinguish a portion of the published digital content to indicate that the portion corresponds to a current position in the streaming audio content.

12. The computer readable, non-transitory storage medium of claim 11, wherein visually distinguishing a portion of the published digital content comprises highlighting, emboldening or underlining text content.

13. The computer readable, non-transitory storage medium of claim 11, wherein the visually distinguished portion comprises at least one of a word, syllable, letter, sentence, line or paragraph.

* * * * *